United States Patent [19]

Bolgiano et al.

[11] Patent Number: 5,614,914

[45] Date of Patent: Mar. 25, 1997

[54] WIRELESS TELEPHONE DISTRIBUTION SYSTEM WITH TIME AND SPACE DIVERSITY TRANSMISSION FOR DETERMINING RECEIVER LOCATION

[75] Inventors: D. Ridgely Bolgiano, Gladwyne, Pa.; Gilbert E. LaVean, Reston, Va.

[73] Assignee: Interdigital Technology Corporation, Wilmington, Del.

[21] Appl. No.: 301,230

[22] Filed: Sep. 6, 1994

[51] Int. Cl.$^6$ .................................................. G01S 3/02
[52] U.S. Cl. ............................................. 342/364; 342/457
[58] Field of Search ..................................... 342/463, 464, 342/386, 417, 457

[56] References Cited

U.S. PATENT DOCUMENTS

| | | |
|---|---|---|
| 4,426,712 | 1/1984 | Gorski-Popiel . |
| 4,675,863 | 6/1987 | Paneth et al. . |
| 4,901,307 | 2/1990 | Gilhousen et al. . |
| 5,043,736 | 8/1991 | Darnell et al. . |
| 5,081,643 | 1/1992 | Schilling . |
| 5,101,501 | 3/1992 | Gilhousen et al. . |
| 5,103,459 | 4/1992 | Gilhousen et al. . |
| 5,109,390 | 4/1992 | Gilhousen et al. . |

(List continued on next page.)

OTHER PUBLICATIONS

"Spread Spectrum for Commercial Communications" Apr. 1991 IEEE Communications Magazine.

"Field Tests Designed to Demonstrated Increased Spectral ... " IEEE Global Telecommunications Conference Dec. 1991, vol. 2.

"Urban Suburban Out of Sight Propagation Modeling" IEEE Communications Magazine, Jun. 1992.

"PCN Field Test Expirements using Broadcom CDMA" Vehicular Technology Society—42nd UTS Conference, May 1992.

"Indoor Propagation and Fading Characterization of Spread Spectrum" Globecom '92—IEEE Global Telecommunication Conference, Dec. 1992.

"Microwave Mobil Communications", William C. Jakes, Jr. John Wiley & Sons, 1974.

Ultraphone System Description—GP110 Interdigital Communications Corporation, 1991.

Ultraphone System Description—GP130 Interdigital Communications Corporation, Jan. 1994.

*Primary Examiner*—Theodore M. Blum

[57] ABSTRACT

A wireless communication system combines time and space diversity to reduce fading and simplify receiver design. In particular, a data packet which carries digital telephone traffic, is transmitted at three different times from three different antennas. The mobile subscriber receiver thus receives the same data packet at three different times from three different antennas, and uses the best data packet or combination of the data packets to reduce the effects of fading. A transfer station receives a time division multiplex multiple access (TDMA) signal from a base station carrying telephone data packet traffic to form three data packet repeats at spatially diverse antennas locations. The transfer station further modulates a code division multiple access (CDMA) system using a TDMA signal which links the mobile subscriber receiver to the transfer station. Each data packet received at the transfer station is thus retransmitted at three different times to the mobile subscriber station on a CDMA link. In one embodiment, each transfer station includes the three space diversity antennas. In a second embodiment, three transfer stations, each with one spatially diverse antenna is used. The time division and code division multiplex signals transmitted from space diversity antennas provide the ability to determine subscriber location using the same communication signals which are used for the primary telephone data communication. Specifically, the subscriber station receiver uses the absolute and relative time of arrival of the three repeated data packets to determine the respective distances of the mobile subscriber station to the three transmitting antennas. Since the transmitting antennas are at known fixed locations, receiver location is determined.

80 Claims, 19 Drawing Sheets

U.S. PATENT DOCUMENTS

| | | |
|---|---|---|
| 5,155,689 | 10/1992 | Wortham . |
| 5,166,951 | 11/1992 | Schilling . |
| 5,193,101 | 3/1993 | McDonald et al. . |
| 5,208,756 | 5/1993 | Song . |
| 5,218,367 | 6/1993 | Sheffer et al. . |
| 5,218,618 | 6/1993 | Sagey . |
| 5,223,844 | 6/1993 | Mansell et al. . |
| 5,260,943 | 11/1993 | Comroe et al. .......................... 370/95.1 |
| 5,260,967 | 11/1993 | Schilling . |
| 5,280,472 | 1/1994 | Gilhousen et al. . |
| 5,289,527 | 2/1994 | Tiedemann, Jr. . |
| 5,345,467 | 9/1994 | Lomp et al. . |
| 5,365,516 | 11/1994 | Jandrell ..................................... 370/18 |

TRANSFER STATION REVERSE CHANNEL

FIG. 10A

TRANSFER STATION CDMA OUTPUT TO ANTENNAS (FORWARD CHANNEL)

| TIME SLOTS | 1 | 2 | 3 | 4 | 5 | 6 | 1 | 2 |
|---|---|---|---|---|---|---|---|---|
| ANTENNA A | $T_1$ | $T_2$ | $T_3$ | $T_4$ | $T_5$ | $T_6$ | $T_1$ | $T_2$ |
| ANTENNA B | $T_6$ | $T_1$ | $T_2$ | $T_3$ | $T_4$ | $T_5$ | $T_6$ | $T_1$ |
| ANTENNA C | $T_4$ | $T_5$ | $T_6$ | $T_1$ | $T_2$ | $T_3$ | $T_4$ | $T_5$ |

—1002

TRANSFER STATION CDMA INPUT FROM ANTENNAS (REVERSE CHANNEL)

| TIME SLOTS | 1 | 2 | 3 | 4 | 5 | 6 | 1 | 2 |
|---|---|---|---|---|---|---|---|---|
| ANTENNA A | $R_5$ | $R_6$ | $R_1$ | $R_2$ | $R_3$ | $R_4$ | $R_5$ | $R_6$ |
| ANTENNA B | $R_5$ | $R_6$ | $R_1$ | $R_2$ | $R_3$ | $R_4$ | $R_5$ | $R_6$ |
| ANTENNA C | $R_5$ | $R_6$ | $R_1$ | $R_2$ | $R_3$ | $R_4$ | $R_5$ | $R_6$ |

—1004

$T_X$ = TRANSMITTER CHANNEL X    $R_X$ = RECEIVER CHANNEL X

FIG. 10B

TRANSFER STATION CDMA OUTPUT TO ANTENNAS (FORWARD CHANNEL)

| TIME SLOTS | 1 | 2 | 3 | 4 | 5 | 6 | 1 | 2 |
|---|---|---|---|---|---|---|---|---|
| ANTENNA A | $T_{1,7}$ | $T_{2,8}$ | $T_{3,9}$ | $T_{4,10}$ | $T_{5,11}$ | $T_{6,12}$ | $T_{1,7}$ | $T_{2,8}$ |
| ANTENNA B | $T_{6,12}$ | $T_{1,7}$ | $T_{2,8}$ | $T_{3,9}$ | $T_{4,10}$ | $T_{5,11}$ | $T_{6,12}$ | $T_{1,7}$ |
| ANTENNA C | $T_{4,10}$ | $T_{5,11}$ | $T_{6,12}$ | $T_{1,7}$ | $T_{2,8}$ | $T_{3,9}$ | $T_{4,10}$ | $T_{5,11}$ |

—1006

TRANSFER STATION CDMA INPUT FROM ANTENNAS (REVERSE CHANNEL)

| TIME SLOTS | 1 | 2 | 3 | 4 | 5 | 6 | 1 | 2 |
|---|---|---|---|---|---|---|---|---|
| ANTENNA A | $R_{5,11}$ | $R_{6,12}$ | $R_{1,7}$ | $R_{2,8}$ | $R_{3,9}$ | $R_{4,10}$ | $R_{5,11}$ | $R_{6,12}$ |
| ANTENNA B | $R_{5,11}$ | $R_{6,12}$ | $R_{1,7}$ | $R_{2,8}$ | $R_{3,9}$ | $R_{4,10}$ | $R_{5,11}$ | $R_{6,12}$ |
| ANTENNA C | $R_{5,11}$ | $R_{6,12}$ | $R_{1,7}$ | $R_{2,8}$ | $R_{3,9}$ | $R_{4,10}$ | $R_{5,11}$ | $R_{6,12}$ |

—1008

$T_X$ = TRANSMITTER CHANNEL X    $R_X$ = RECEIVER CHANNEL X
$T_{X,Y}$ = TRANSMITTER CHANNELS X AND Y    $R_{X,Y}$ = RECEIVER CHANNELS X AND Y

FIG. 11A

TRANSFER STATION CDMA OUTPUT TO ANTENNAS (FORWARD CHANNEL)

ANTENNA A

| TIME SLOTS | 1 | 2 | 3 | 4 | 5 | 6 | 1 | 2 |
|---|---|---|---|---|---|---|---|---|
| | $T_1$ | $T_2$ | $T_3$ | $T_4$ | $T_5$ | $T_6$ | $T_1$ | $T_2$ |
| | $T_7$ | $T_8$ | $T_9$ | $T_{10}$ | $T_{11}$ | $T_{12}$ | $T_7$ | $T_8$ |
| | $T_{13}$ | $T_{14}$ | $T_{15}$ | $T_{16}$ | $T_{17}$ | $T_{18}$ | $T_{13}$ | $T_{14}$ |
| | $T_{19}$ | $T_{20}$ | $T_{21}$ | $T_{22}$ | $T_{23}$ | $T_{24}$ | $T_{19}$ | $T_{20}$ |

— 1102

ANTENNA B

| TIME SLOTS | 1 | 2 | 3 | 4 | 5 | 6 | 1 | 2 |
|---|---|---|---|---|---|---|---|---|
| | $T_6$ | $T_1$ | $T_2$ | $T_3$ | $T_4$ | $T_5$ | $T_6$ | $T_1$ |
| | $T_{12}$ | $T_7$ | $T_8$ | $T_9$ | $T_{10}$ | $T_{11}$ | $T_{12}$ | $T_7$ |
| | $T_{18}$ | $T_{13}$ | $T_{14}$ | $T_{15}$ | $T_{16}$ | $T_{17}$ | $T_{18}$ | $T_{13}$ |
| | $T_{24}$ | $T_{19}$ | $T_{20}$ | $T_{21}$ | $T_{22}$ | $T_{23}$ | $T_{24}$ | $T_{19}$ |

— 1104

ANTENNA C

| TIME SLOTS | 1 | 2 | 3 | 4 | 5 | 6 | 1 | 2 |
|---|---|---|---|---|---|---|---|---|
| | $T_4$ | $T_5$ | $T_6$ | $T_1$ | $T_2$ | $T_3$ | $T_4$ | $T_5$ |
| | $T_{10}$ | $T_{11}$ | $T_{12}$ | $T_7$ | $T_8$ | $T_9$ | $T_{10}$ | $T_{11}$ |
| | $T_{16}$ | $T_{17}$ | $T_{18}$ | $T_{13}$ | $T_{14}$ | $T_{15}$ | $T_{16}$ | $T_{17}$ |
| | $T_{22}$ | $T_{23}$ | $T_{24}$ | $T_{19}$ | $T_{20}$ | $T_{21}$ | $T_{22}$ | $T_{23}$ |

TRANSFER STATION CDMA INPUT FROM ANTENNAS (REVERSE CHANNEL)

ANTENNA A, ANTENNA B AND ANTENNA C HAVE IDENTICAL TIME SLOTTING

| | 1 | 2 | 3 | 4 | 5 | 6 | 1 | 2 |
|---|---|---|---|---|---|---|---|---|
| | $R_5$ | $R_6$ | $R_1$ | $R_2$ | $R_3$ | $R_4$ | $R_5$ | $R_6$ |
| | $R_{11}$ | $R_{12}$ | $R_7$ | $R_8$ | $R_9$ | $R_{10}$ | $R_{11}$ | $R_{12}$ |
| | $R_{17}$ | $R_{18}$ | $R_{13}$ | $R_{14}$ | $R_{15}$ | $R_{16}$ | $R_{17}$ | $R_{18}$ |
| | $R_{23}$ | $R_{24}$ | $R_{19}$ | $R_{20}$ | $R_{21}$ | $R_{22}$ | $R_{23}$ | $R_{24}$ |

— 1108

TRANSFER STATION

SUBSCRIBER STATION

CENTRALIZED AND INTEGRATED TRANSFER STATION

TRANSFER STATION ANTENNA IMPLEMENTATION

DISTRIBUTED ANTENNA IMPLEMENTATION USING CABLE OR FIBER-OPTIC CABLE

SYNCH AND CONTROL CHANNEL STRUCTURE

TIME CALIBRATION FOR DISTRIBUTED ANTENNA IMPLEMENTATION

LOCATION CENTER EXTERNAL TO COMMUNICAITON SYSTEM

FIG. 20
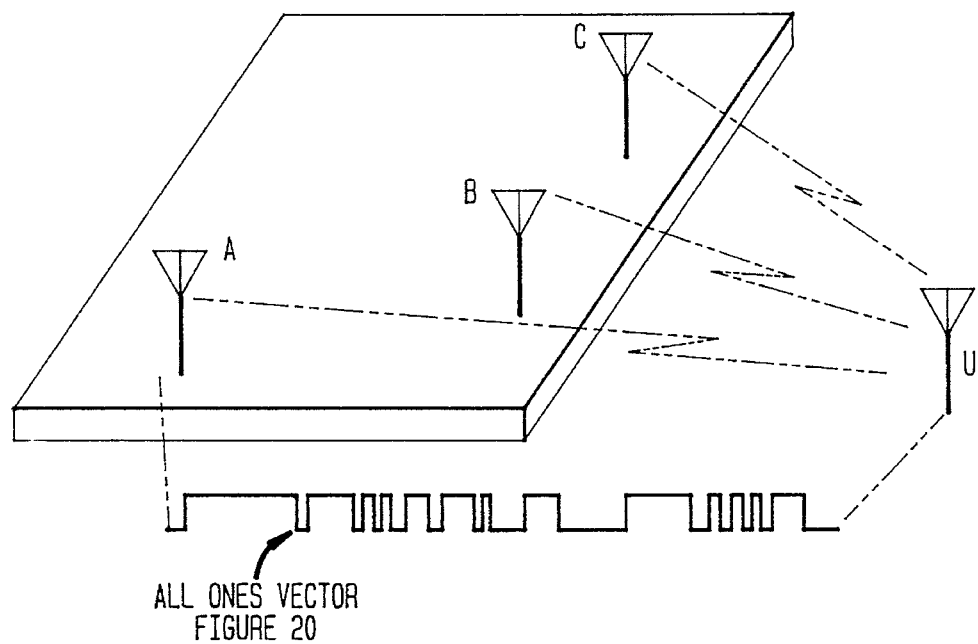
ALL ONES VECTOR
FIGURE 20
FIG. 21
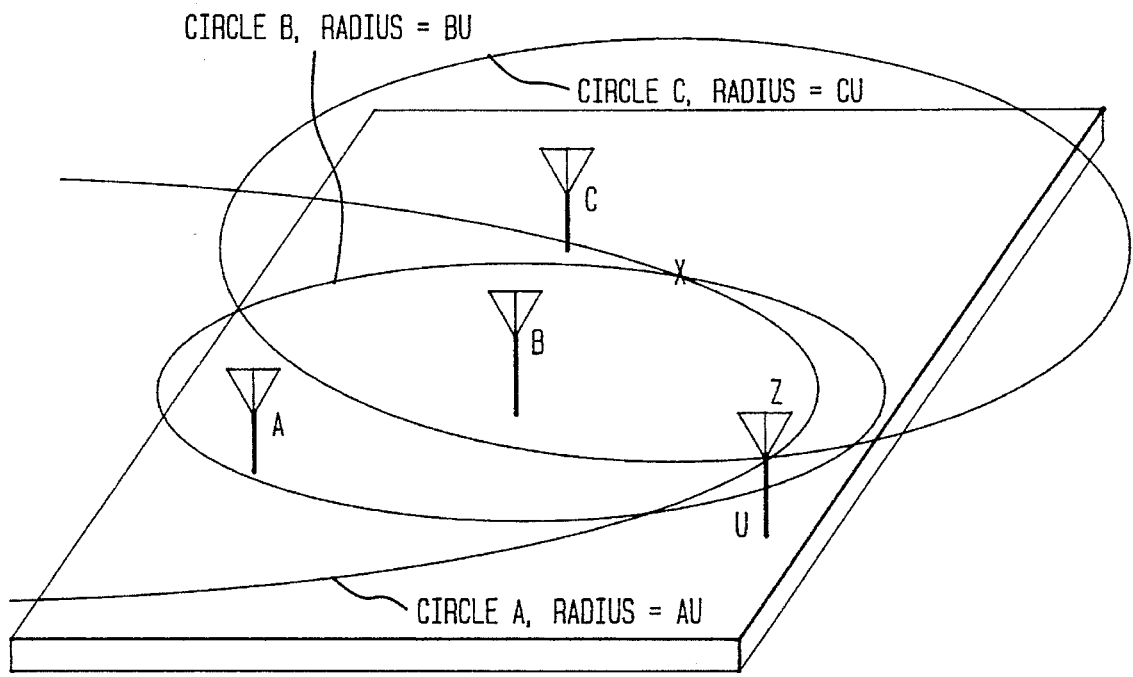

WIRELESS TELEPHONE DISTRIBUTION SYSTEM WITH TIME AND SPACE DIVERSITY TRANSMISSION FOR DETERMINING RECEIVER LOCATION

FIELD OF THE INVENTION

The present invention relates to two way wireless communication systems. In particular, the present invention relates to wireless telephone systems with space diversity antennas and time diversity signal transmission for reducing signal fading and measuring subscriber location.

BACKGROUND OF THE INVENTION

Wireless radio communication is subject to the adverse effects of signal fading, in which the signal level at the receiver temporarily loses strength for a variety of reasons, such as from variable multipath reflections causing signal cancellation, time varying transmission loss due to atmospheric conditions, and mobile receiver movement introducing obstructions into the signal path, and the like. Signal fading causes poor reception, inconvenience, or in extreme cases, a loss of call connection.

It is known to use various forms of signal diversity to reduce fading. For example, as indicated in U.S. Pat. No. 5,280,472, signal diversity mitigates the deleterious effects of fading. There are three major types of diversity: time diversity, frequency diversity and space diversity.

Time diversity is obtained by the use of repetition, interleaving or error correction coding, which is a form of repetition. Error detection techniques in combination with automatic retransmission, provide a form of time diversity.

In frequency diversity, signal energy is spread over a wide bandwidth to combat fading. Frequency modulation (FM) is a form of frequency diversity. Another form of frequency diversity is code division multiple access (CDMA) also know as spread spectrum. Due to its inherent nature as a wideband signal, CDMA is less susceptible to fading as compared to a narrow band modulation signal. Since fading generally occurs in only a portion of the radio spectrum at any one given time, a spread spectrum signal is inherently resistant to the adverse effects of fading.

Space diversity is provided by transmitting or receiving the same signal on more than one geographically separated antennas. Space diversity provides alternate signal paths to guard against any one path being subject to fading at any one time. Space diversity also creates some time diversity since the receiver receives the same signal separated by small propagation delays. The difference in propagation delay requires that the receiver be able to discriminate between the arriving signals. One solution is to use multiple receivers, one for each arriving signal. For instance, it is known from U.S. Pat. No. 5,280,472 to deliberately introduce relatively small delays compared to an information symbol, into a space diversity multiple antenna CDMA system in order to create artificial multipath time diversity signals greater than one chip delay up to a few chips. CDMA systems are capable of discriminating between identical plural signals arriving at the receiver with different propagation delays greater than one chip delay. Such receivers are known as Rake receivers. However, prior art systems require multiple CDMA receivers, one CDMA receiver for each separate received CDMA signal. It is desirable to provide a system for receiving time diversity CDMA signals which does not require multiple CDMA receivers.

Measuring or determining the location of mobile units is well known. In some systems, fixed antennas measure the mobile location. In other systems, the mobile unit determines its location from multiple received signals. If the system is two way, the communication link permits both the mobile subscriber and the fixed system to exchange location data. Various known systems use satellites or multiple antennas to provide information on the location of a mobile subscriber. For example, multiple directional receiving antennas can be used to triangulate the position of a mobile transmitter. In such systems, the stationary receivers determine the mobile subscriber location; in other systems, the mobile subscriber determines its location from the received signals. For example, the Global Position System (GPS) is a multiple satellite system providing signals which permit a mobile subscriber station to determine its position in latitude and longitude. However, both satellite systems and the GPS receivers for receiving satellite signals tend to be expensive.

The combination of a GPS receiver and a cellular telephone is shown in U.S. Pat. No. 5,223,844. Such combination provides useful services, as for example a security alarm service to deter car theft, in which tripping the alarm also alerts the security service to the location of the car. Generally, it is desirable to provide a system which combines telephone or data service with location measurement at a reasonable cost.

It is desirable to provide a system of time diversity signals using time division multiple access (TDMA) in various combinations with CDMA and space diversity antennas, to provide a variety of systems which resist fading, reduce receiver cost, and provide location measurement for mobile subscribers.

SUMMARY OF THE INVENTION

The present invention is embodied in a wireless communication system in which time diversity and space diversity is used to reduce fading and simplify receiver design. The present invention is further embodied in a wireless communication system in which time division signals are code division (spread spectrum) multiplexed onto space diverse antennas to provide a wireless communication system with the ability to determine subscriber location using the same communication signals which are used for the primary wireless communication.

Specifically, a data packet which for example may carry telephone voice traffic, is transmitted at three different times from three different antennas. The receiver thus receives the same data packet at three different times from three different antennas. The receiver uses the best data packet or combination of the data packets to reduce the effects of fading.

In addition, the receiver uses the absolute and extrapolated relative time of arrival of the three data packets to determine its location from the three transmitting antennas. First, absolute range to one antenna is determined by the time required for a round trip message. Then, the relative time of arrival of data packets, referenced to a universal time, from the two other antennas indicates the relative distances as compared to the first antenna. Since all three transmitting antennas are at known fixed locations, the receiver computes its own location as the intersection of three constant distance curves (in the two dimensional case, circles, or in the three dimensional case, the intersection of three spheres). In the alternative, the mobile subscriber station provides raw delay measurement data back to a fixed station, or location service center, which computes the mobile subscriber location.

More particularly, the present invention is embodied in a system using CDMA to modulate a TDMA signal which is transmitted from three space diversity antennas. In a first embodiment, the TDMA signals are used to transmit multiple repetitions of the same data packet from a transfer station with three space diversity antennas. In a second embodiment, the TDMA signals are used to transmit multiple repetitions of the same data packet from three transfer stations each transfer station including one of the three space diversity antennas. The data packets could either be identical, or could carry substantially the same information, but modulated with different spreading codes or different segments of the same spreading code.

BRIEF DESCRIPTION OF THE FIGURES

FIG. 10A is a time slot assignment diagram of a wireless telephone distribution system in accordance with the present invention illustrating the time division multiplexing and code division multiplexing for 6 simultaneous calls.

FIG. 10B is a time slot assignment diagram of a wireless telephone distribution system in accordance with the present invention illustrating the time division multiplexing and code division multiplexing for 12 simultaneous calls.

FIGS. 11A and 11B are a time slot assignment diagram of a wireless telephone distribution system in accordance with the present invention illustrating the time division multiplexing and code division multiplexing for 24 simultaneous calls.

FIG. 20 is an illustration of a system in accordance with the present invention for determining location of a mobile subscriber station.

FIG. 21 is a system in accordance with the present invention illustrating a method for determining location of a mobile subscriber station.

DETAILED DESCRIPTION

SYSTEM DESCRIPTION—FIRST EMBODIMENT FIGS. 1, 2, 3, 8, 9

Figure 1:
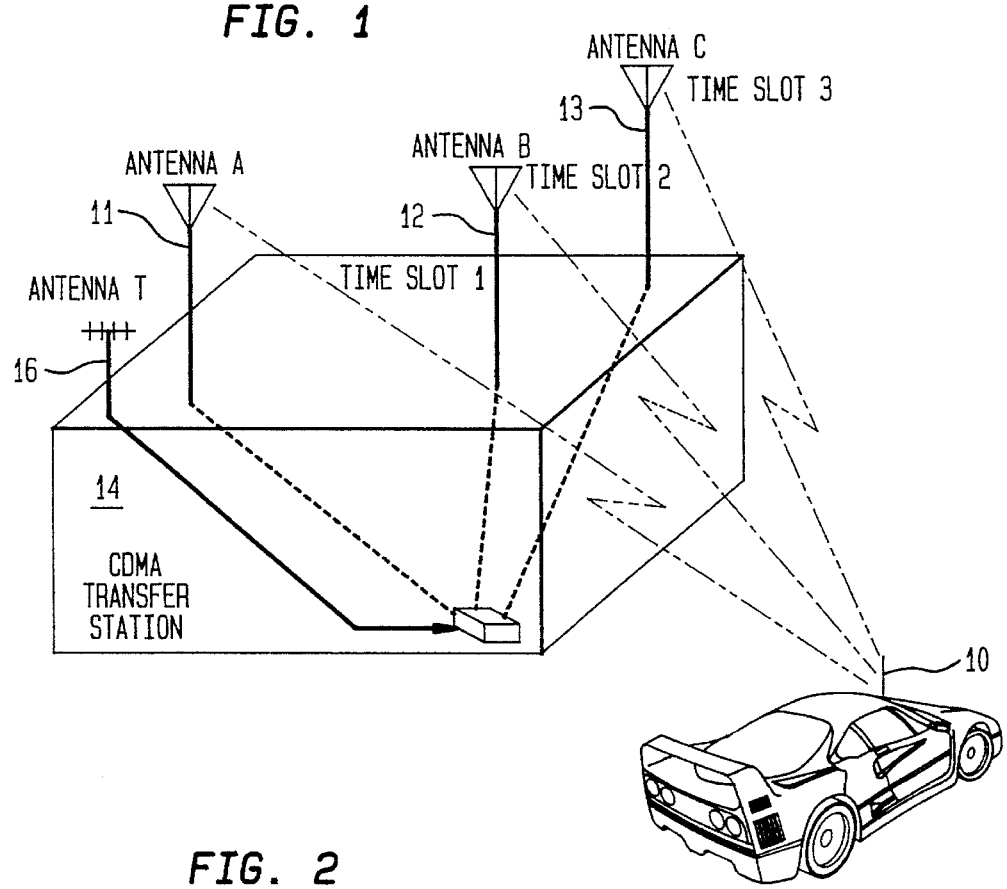
FIG. 1 is a system diagram of a wireless telephone distribution system including a first embodiment of a transfer station in accordance with the present invention.

In a first embodiment of the invention shown in FIG. 1, a mobile user having an antenna 10 is coupled to a CDMA transfer station 14. The CDMA transfer station 14 further includes an antenna T, 16, antenna A, 11, antenna B, 12, and antenna C, 13. Antennas A, B and C can be mounted either on separate structures as is shown, or on a single mast. The only physical requirement is that the space between antennas should be sufficient for uncorrelated space diversity. While a quarter wavelength spacing may be sufficient, at least ten wavelengths is preferable. At 1 GHz, 10 wavelengths is about 30 feet, while at 5 GHz, 10 wavelengths is about 6 feet.

The mobile subscriber antenna 10 (also referred herein as the user terminal antenna, or the subscriber station antenna, or simply antenna U) is coupled by a bidirectional radio link to antennas A, B and C. The CDMA transfer station 14 is further coupled by a bidirectional radio link through antenna T through appropriate switching to the public switch telephone network.

In operation, forward channel telephone voice traffic received in data packets on antenna T is transmitted on antenna A during time slot 1, repeated on antenna B during time slot 2, and further repeated on antenna C during time slot 3. All three repeated data packets are sequentially received on antenna 10. In the reverse direction, data packets representing telephone voice traffic transmitted from antenna 10 are substantially simultaneously received on antennas A, B and C. The CDMA transfer station 14 further retransmits data packets received in the reverse direction through antenna T back to the telephone network.

Figure 2:
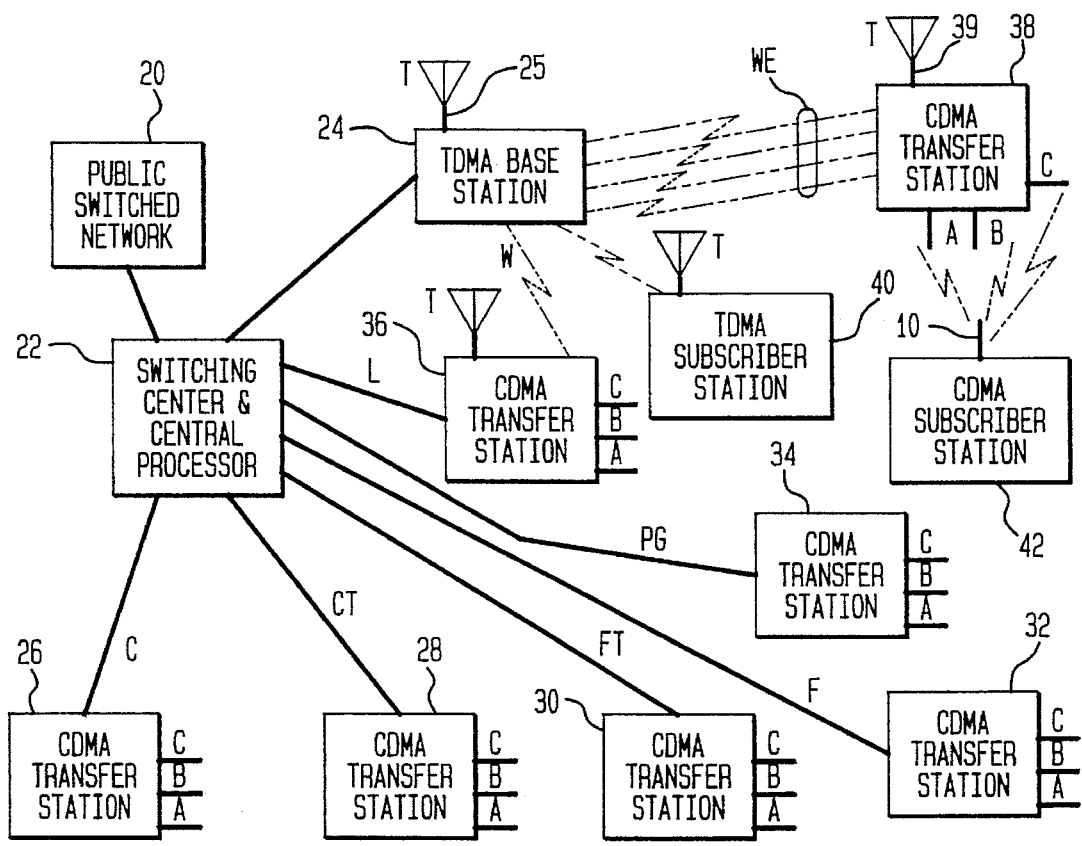
FIG. 2 is a block diagram of a first embodiment of a wireless telephone distribution system in accordance with the present invention.

FIG. 2 is an overview diagram of a system in accordance with the present invention that includes the different interconnections between the supporting network, i.e., between the public switched network 20 and switching center and central processor 22, and the CDMA transfer stations 26, 28, 30, 32, 34, 36 and 38.

The user at CDMA subscriber station 42 is linked by antenna 10 to the CDMA transfer station 38 through antennas A, B and C. Antenna T, 39 on CDMA transfer station 38 carries wireless TDMA telephone voice traffic to antenna 25 on base station 24. Each of the other CDMA transfer stations are coupled to the switching center 22 by a variety of interconnection means. Connection means W between TDMA base station 24 and CDMA transfer station 36 is a wireless means, having a TDMA channel structure with six TDMA slots. The wireless TDMA distribution interconnection WE may be a commercially available wireless local loop system such as the Ultraphone® digital radio telephone system provided by Interdigital Communications Corporation. The TDMA time slot structure is carried through the transfer station to become the time slot structure for the slotted CDMA signal on the output. Connection means WE is the same as connection W except there are four W modules operating in parallel to provide a basic connectivity for 24 voice channels. Connection means F uses a fiberoptic cable that connects between the switching center 22 to the CDMA transfer station 32 without going through a wireless base station. Since connection means F (fiberoptic cable) incorporates a modem with a TDM/TDMA channel structure similar to W and WE it readily interfaces with the transfer station. Connection FT (fiberoptic cable carrying standard T1 multiplex) between switching center 22 and CDMA transfer station 30 is a fiberoptic cable that uses a standard T1 multiplexer as the channel combining means. Therefore, the transfer station that handles the WE connection means could readily be adapted to operate with the FT connection means. Connections C (coaxial cable) to CDMA transfer station 26, and CT to CDMA transfer station 28, (coaxial cable carrying T1 standard multiplex) are cable means that function like F and FT respectively. Connection means L to CDMA transfer station 36 is a conditioned line that carries up to a 100 kb/s data stream that has the same structure as the wireless TDMA, connection means W. Connection means LE (not shown) utilizes 4 conditioned lines to function in the same way as connection means WE. Connection means PG to CDMA transfer station 34 is a pair gain capability that is interfaced into a transfer station.

Using a combination of over the air and fiberoptic/cable media, to connect to the transfer stations, and a common output air interface, between the transfer stations and the CDMA user terminals, results in a flexible rapid response and economical solution. In addition, normal telephone lines conditioned to handle 64 kb/s to 100 kb/s could also be used to replace the TDMA wireless input to the transfer station. It also is very cost effective to connect the input side of the transfer station to the output of a pair gain module. Since the air interface remains the same for all these interconnection means, this extended concept becomes a very cost effective solution and transition vehicle.

Figure 3:
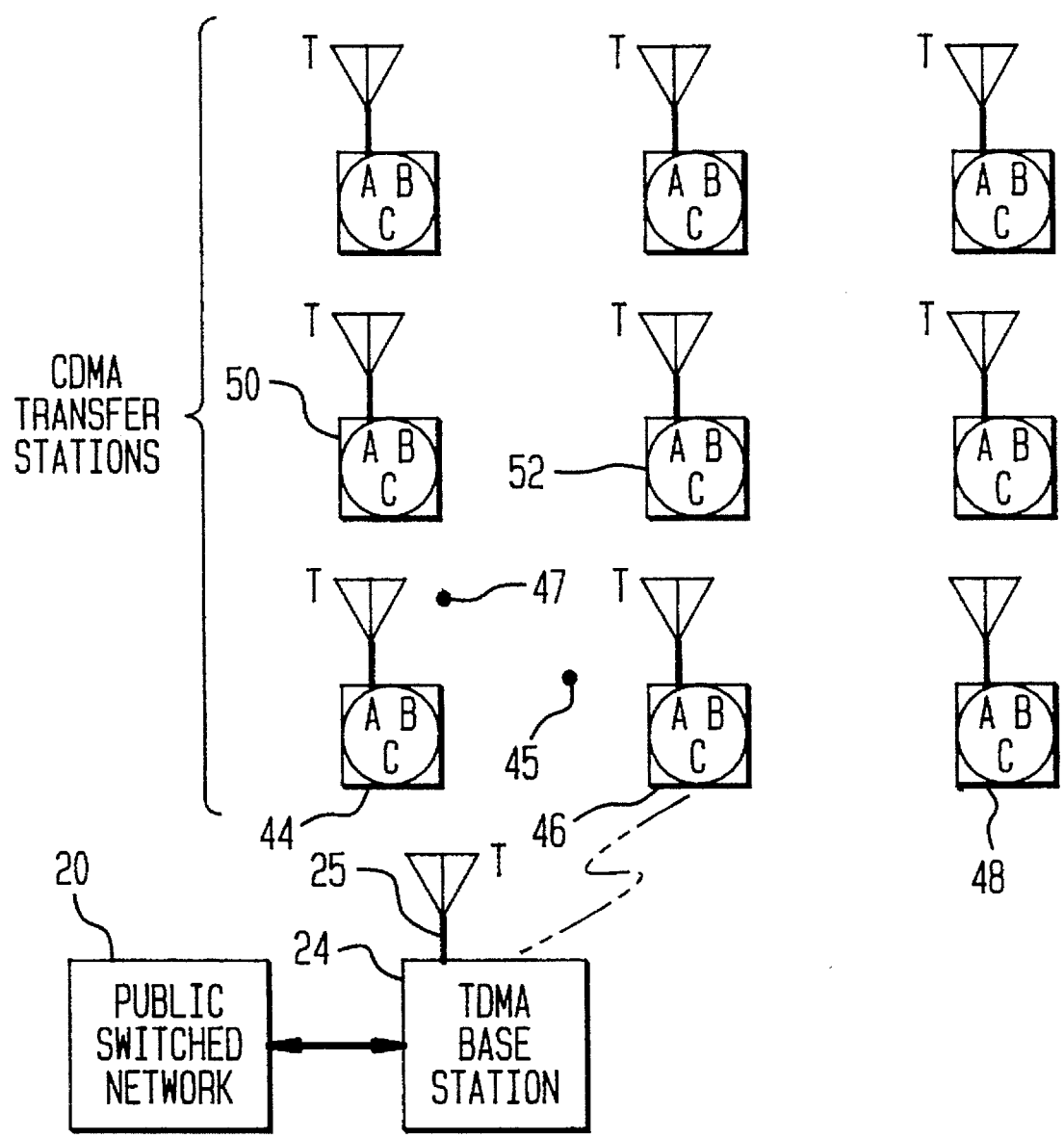
FIG. 3 is a system diagram of a first embodiment of a wireless telephone distribution system in accordance with the present invention.

In the system diagram of FIG. 3, telephone voice traffic through the public switched network 20, is coupled to a TDMA base station 24 having antenna 25 for the transmission and reception of TDMA signals. A plurality of CDMA transfer stations 44, 46, 48, 50 and 52 provide wireless telephone service for a plurality of subscribers 45 and 47. Each CDMA transfer station includes an antenna T for receiving and transmitting TDMA signals, as well as separate antenna A, antenna B and antenna C for communicating with mobile subscribers 45 and 47. By way of example, the TDMA base station 24 may have a range of 35 mile radius covering numerous CDMA transfer stations. Each CDMA transfer station may typically have a range of five miles and be spaced three miles apart to provide cellular coverage for the entire area. Subscriber 45 will be served by CDMA transfer station 46, while subscriber 47 will be served by CDMA transfer station 50. As subscribers move about the system, a different CDMA transfer station will be assigned to serve that subscriber.

An alternate embodiment capitalizes on the rich connectivity described above to more widely distribute the three antennas that are used to give transmission space diversity. The wider distribution allows compensation for not only multipath fading, but fading due to blockage. For instance if the CDMA user (antenna 10 in FIG. 1) goes behind a building or hill the signal from all three space diversity antennas, on a single transfer station, would fade.

Figure 4:
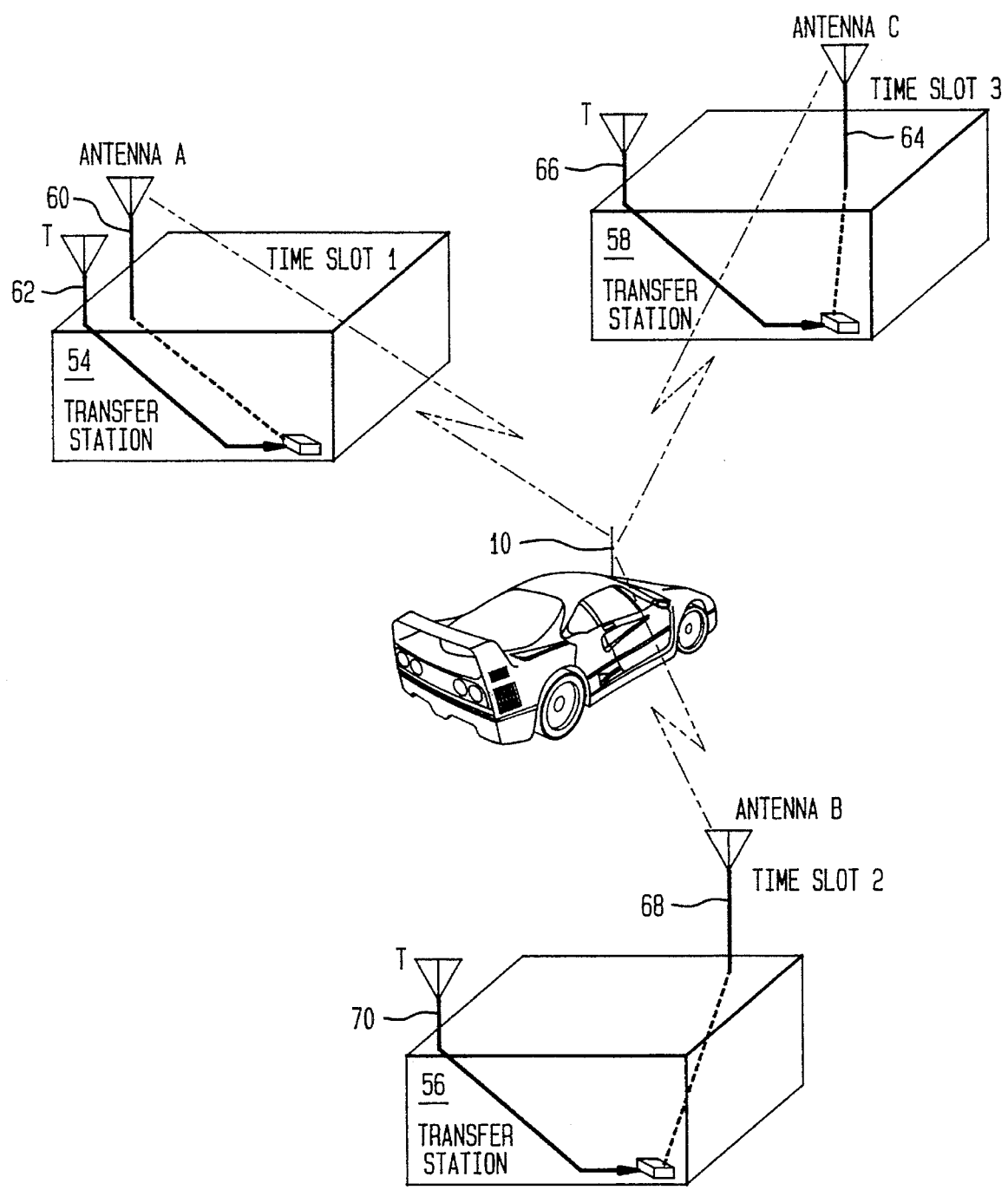
FIG. 4 is a system diagram of a wireless telephone distribution system including a second embodiment of a transfer station in accordance with the present invention.

However, if the energy in each time slot was transmitted from different transfer stations as in FIG. 4, there is a high probability the user terminal would not be blocked from all three transfer stations at the same time. Therefore, it is possible to randomize the effects of fading due to blockage and be more similar to multipath fading. Randomization is accomplished by having the central controller assign the different time slots on an individual basis during the call setup process. When implemented using a W or WE connection means, there is little impact on the capacity between the base stations and the transfer stations, but it would increase the number of TDMA receivers. However, there is also a diversity improvement on the base station to transfer station link. Generally speaking, the impact on the other hard wired connection means is even less. A major advantage of using multiple transfer stations as transmission diversity sources is that it allows the user CDMA receiver to evaluate the quality of the signal from each transfer station and request a handoff for individual time slots as better links are found, providing a highly reliable and smooth transition as a user passes through an area.

SYSTEM DESCRIPTION—SECOND EMBODIMENT FIGS. 4, 5, 6, 12

FIG. 4 illustrates a wireless telephone distribution system with enhanced space diversity. As before, a mobile user antenna 10 is coupled to antenna A during time slot 1, antenna B during time slot 2 and antenna C during time slot 3. However, each of antennas A, B and C are mounted on separate respective CDMA transfer stations 54, 56 and 58. In particular, an antenna A, 60 is provided on CDMA transfer station 54, antenna B, 68 is provided CDMA transfer station 56, and antenna C, 64 is provided on CDMA transfer station 58. Each of the respective transfer stations 54, 56 and 58 are coupled through respective antennas 62, 70 and 66 to the TDMA wireless digital telephone system. The signals received from antennas A, B and C by the subscriber station antenna 10 are similar to that received in the configuration of FIG. 4. However, due to the separation of antennas A, B and C, at separate CDMA transfer stations 54, 58, 58, signal diversity both transmitting and receiving, is vastly improved.

Figure 6:
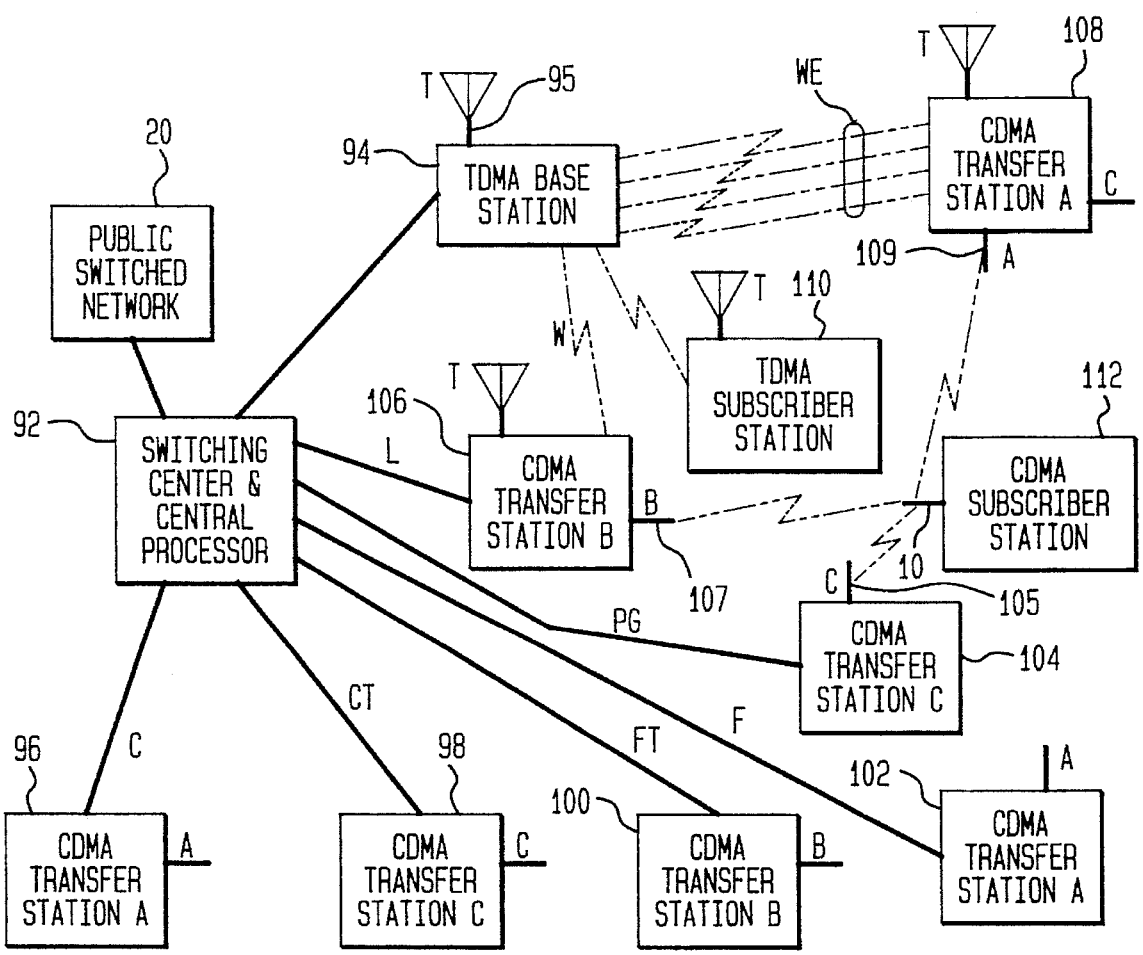
FIG. 6 is a block diagram of a second embodiment of a wireless telephone distribution system in accordance with the present invention.

The system configuration of FIG. 6 is similar to that of FIG. 2 with the exception that each CDMA transfer station has either an antenna B, or antenna B or an antenna C. For example, CDMA transfer station A, 108, has a separate antenna A, 109. The CDMA transfer station 106 has an antenna B, 107. Similarly, CDMA transfer station 104 has an antenna C, 105. Thus, the antenna 10 of CDMA subscriber station 112 receives signals from each of CDMA transfer stations 108, 106 and 104. The received signals are time division multiplexed in the sense that only one of antenna A, B or C is transmitting to antenna 10 at any one time. During transmission, however, antennas A, B and C provide multiple code division multiplexed signals to other users.

Figure 5:
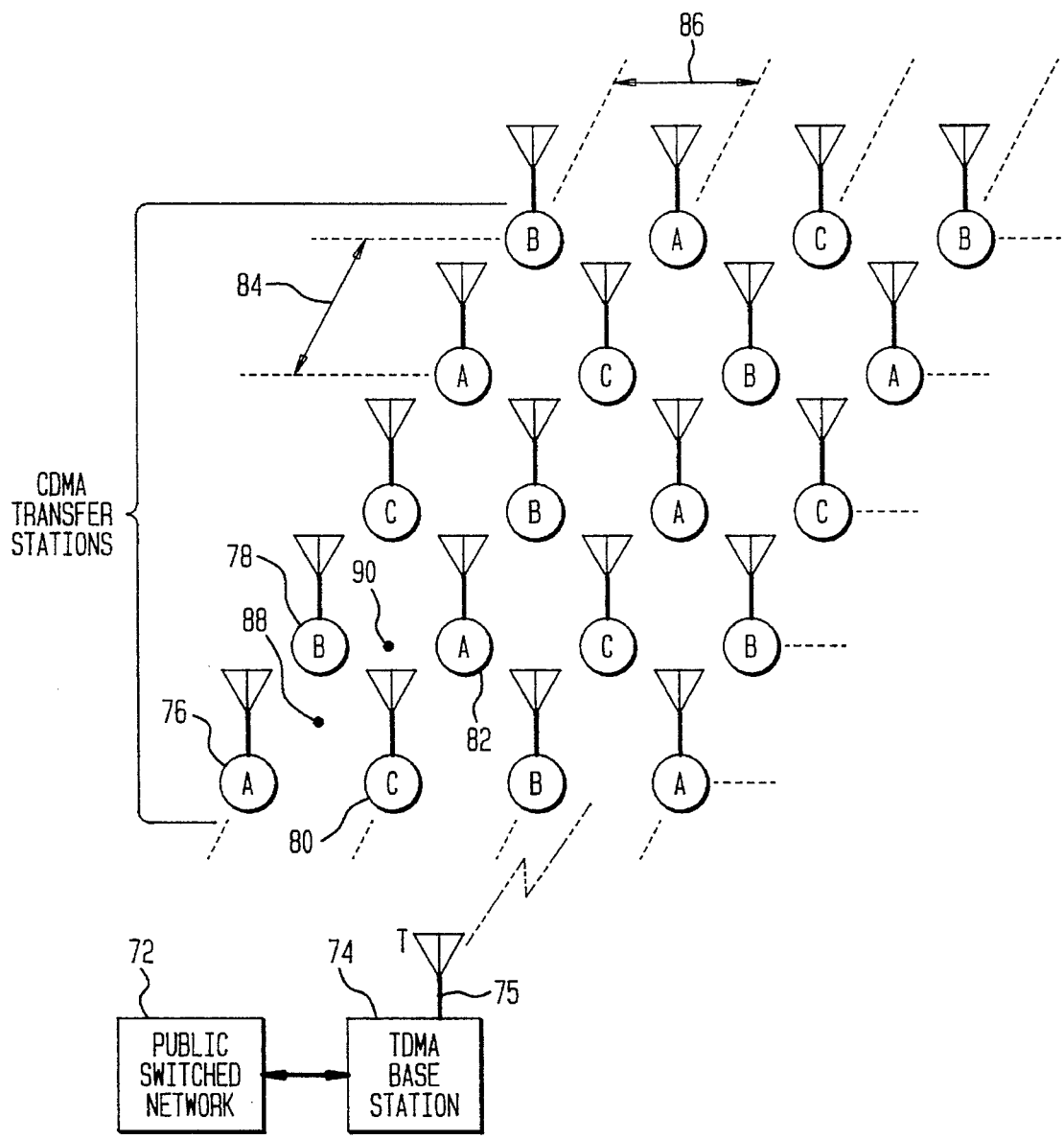
FIG. 5 is a system diagram of a second embodiment of a wireless telephone distribution system in accordance with the present invention.

In this embodiment, each transfer station has only one type of antenna: either antenna A, antenna B or antenna C. A system arrangement covering a service area is illustrated in FIG. 5. As before, the public switch network 72 is coupled to a TDMA base station 74 having a transmitting antenna 75 covering an area of approximately a 35 mile radius. Throughout the service area, CDMA transfer stations are spaced apart in one direction 84, and in another direction 86 are positioned to cover the service area. For illustration, a regular placement is shown. In practice, the CDMA transfer stations are placed so as to provide coverage whereby a plurality of subscribers 88, 90 are always within range of an A, B and C antenna. For example, CDMA transfer stations 76 and 82 are antenna A type, while CDMA transfer station 80 is an antenna C type and CDMA transfer station 78 is an antenna B type. Thus, subscriber 88 receives signals from CDMA transfer stations 76, 78 and 80, while subscriber 90 may receive signals from CDMA transfer station 82, 78 and 80.

Figure 7:
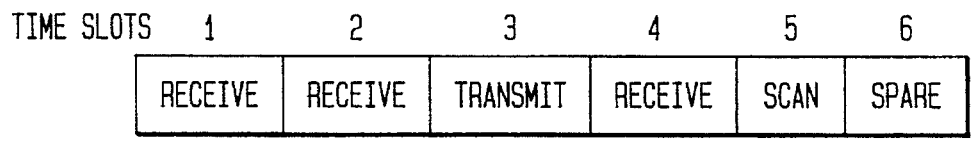
FIG. 7 is timing diagram of a time division multiplex signal which modulates a code division multiplex signal in accordance with the present invention.

A time slot structure for use in the present invention is shown in FIG. 7. Six time slots are used. Time slots 1 and 2 are used to receive, followed by time slot 3 wherein the subscriber station transmits, followed by time slot 4 also used for receiving. During time slot 5 and 6 the CDMA receiver scans the transmission from other transfer stations.

CALL ESTABLISHMENT

Figure 17:
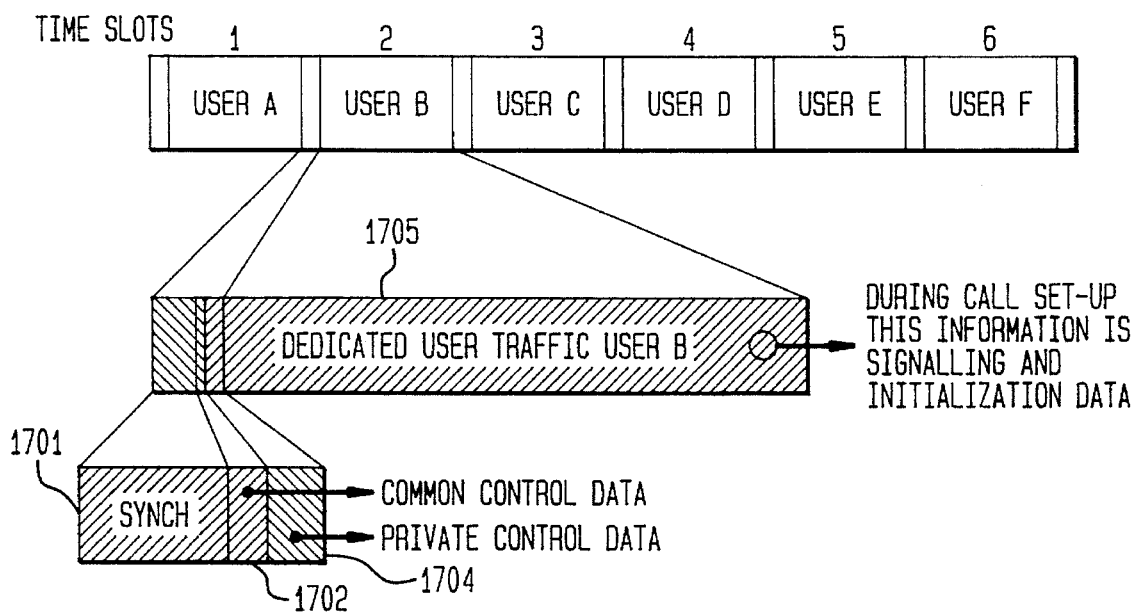
FIG. 17 is timing diagram of a time division multiplex signal which is modulates a code division multiplex signal in accordance with the present invention.

When a circuit is to be established or transferred, the base station assigns a base station and transfer station frequency pair, a slot and a PN sequence. It then transmits to the transfer station all of these assignments and identifies which subscriber is to use the circuit. During call setup, the transfer station passes on to the desired subscriber station, the slot and PN sequence assignments. For example, see FIG. 17 where the TDMA time slots 1 through 8 are associated with users A through F, respectively. In a given time slot, e.g., time slot 2, the message to user B contains synchronizing information 1701, common control data 1702 for system wide functions, private control data 1704 and dedicated user traffic 1705 for user B. The dedicated user traffic 1705 is used during call setup to transmit signalling information and initialization data.

FORWARD PATH

Signal compression and decompression, plus added bits for forward error correction (FEC) is performed at the base station. In the forward direction, (to the subscriber station), the base station transmits continuously but the information in each slot is directed to a particular subscriber station.

By way of example, the base station may transmit the information during slot 1 on frequency fa. The transfer station receives the information by demodulating the signal on frequency fa during slot 1, and regenerating the information only at the symbol or bit level. The transfer station does not perform any decoding (i.e., error correction, compression or decompression). The transfer station design is thus simplified by accepting the already coded signal from the TDMA base station. After regeneration at the symbol level, the received TDMA signal is combined with the assigned PN sequence and retransmitted from the transfer station as a CDMA signal on frequency fp without any intentional delay to antenna A. The transfer station further stores the information received from the base station in a memory buffer. At the end of the antenna A transmission, the information bits stored in memory buffer are modulated onto a continuation of the PN signal and broadcast through an appropriate transmitter to antenna B. Thus, the identical information signal using the same PN sequence, but incremented a fixed number of chips, is transmitted at antenna B. The relative position, or phase of the PN sequence relative to the transmitted information is different. At the conclusion of the first repeat, information in the time slot buffer is read out a third time to provide a third repetition of the information, modulated by a continuation of the PN sequence, with still a different phase, through an appropriate transmitter to antenna C.

SUBSCRIBER STATION PROCESSING

The subscriber station, using the correct CDMA code, receives during each of the three slots containing information signal repetition, so that it receives three identical repeats of the data packet from three antennas located in different locations. The subscriber station then compares the three receptions and selects the one with the best quality which may be based on bit error rate, phase distortion, signal to noise ratio, etc. Thus, spacial transmit diversity is achieved. Only one antenna is needed at the subscriber station. The subscriber station demodulates and decodes the signal, performs error correction, decompression, etc. A maximum likelihood combiner may be used to combine the power from all three time slots. Ideally, the energy of received data packets is combined in a maximal manner before making a hard decision.

During the third time slot T3, the subscriber station transmits back to the transfer station using a similar PN sequence as it received. The PN sequence may be the one derived from reception (after regeneration) or it can be locally generated on the basis of the original code received during call setup. Since the subscriber station does not transmit during the same time period as it receives, no diplexer or notch filter is needed. A simple T/R (transmit/receive) switch is used to switch the antenna between transmit and receive. Only one receiver is necessary in the subscriber station to achieve three branch diversity. The three chains needed by a Rake receiver, are not needed in the present invention.

Furthermore, the benefits of triple time and space redundancy, with some frequency protection provided by the expanded spectrum, are not obtained by adversely affecting capacity. The three branch diversity typically achieves a reduction for deep fades of at least 10 dB (a factor of 10x). While the three transmitted repetitions of the same information signal increases the interference level by a factor of 3 (about 5 dB), because the fades are 10 dB less, the transmitter power levels can be reduced by a factor of 10 (10 dB). Thus the overall amount of interference is reduced by a factor of 10/3 or 5 dB. Because the transfer station to subscriber link is operated in a self interference mode that means that about three times as many simultaneous subscriber circuits can be used than if diversity were not used.

RETURN PATH

In the reverse direction (subscriber station to transfer station), three receivers are connected respectively to the three antennas at the transfer station to provide conventional three branch spacial diversity. The same analysis regarding interference and the number of circuits available, applies to transmission in the reverse direction as well as in the forward direction, except that the information is transmitted only once and is received simultaneously on the three base station antennas.

In addition to increasing the number of subscribers per unit frequency, the present invention is cost effective. First the subscriber station needs only one receiver. Second, it does not need a diplexer. Third, the transfer station does not need to decode or re-encode any signals. The number of subscribers per transmitter is the same, however, since spacial diversity is used in the reverse direction, the number of subscribers per receiver increased. Conversely, the noise of the subscriber station can be allowed to be higher if the full use of the increase in the number of subscribers is not fully utilized.

The signal received by the transfer station from the subscriber station is retransmitted (again with symbol or bit level regeneration but without decoding), from the transfer station back to the base station without intentional delay during the same slot. As long as the slot is within the same TDMA frame or at least with one frame's duration of the slot used from the base station to the transfer station, no additional delay is incurred by the use of the present system.

TRANSFER STATION—FIRST EMBODIMENT
FIGS. 8, 9, 15

The CDMA transfer station has a TDMA input at antenna T. The output side of the transfer station at antennas A, B and C, uses a CDMA structure to reach a large number of subscribers in relatively densely populated areas. CDMA possesses several attributes that make it desirable for this application. The wideband signal is inherently robust in a multipath environment and it has the ability to overcome interference, intentional and otherwise. The possibility that selective fading will cause the entire spectrum to be suppressed decreases as the transmitted spectrum increases. A higher chip rate, or increased TW product, reduces the amount of fade margin that is required to achieve a specified level of performance.

Spread spectrum signals have inherent multipath protection to protect against fading. However, statistical models generally do not take into account the frequency of occurrence or the duration of the fades. The specific geometry at each location, and how the geometry is changing with regard to the receiver, determines the actual fading patterns. For small cells, with low antennas, the difference in path length for strong signals is very likely to be small. The result is flat fading. That is, the spectrum across ten or fifteen megahertz will fade at the same time. Therefore, it is not possible to use the inherent multipath protection characteristics of spread spectrum signals to protect against flat fading unless at least 25 or 30 MHz of spectrum is available. In addition, there is often no multipath of consequence that would have enough delay to gain an advantage from an additional Rake receiver. Even so the use of real or artificial multipaths, requires additional receiver/correlators in the CDMA user terminal. Therefore, to maintain reliable operation using CDMA only, at least 15 dB of margin is required to be added to the link power allocation, particularly to account for the situation where a mobile user stops in one of the nulls or a fixed user shifts location geometry slightly.

The present invention utilizes the other important characteristic of spread spectrum systems, the ability to overcome interference, as the technique to combat the difficult multipath situations. The capacity of a CDMA system is limited by the amount of interference that is received by the desired receiver. As long as the TW product is great enough to bring the desired signal up out of the interference it doesn't matter what the transmitted data rate actually is. Therefore, with the present invention the transmitted information rate is increased to allow the transmitted signal to be repeated three times from three different antennas, thus obtaining transmission triple diversity which allows the transmitted power margin to be reduced by at least 10 dB for a high performance link. Therefore, even though additional interference is introduced into the links, the CDMA processing gain readily overcomes the adverse impact. That is, the gain from the triple diversity far exceeds, in a high quality system, the loss due to added interference.

Figure 8:
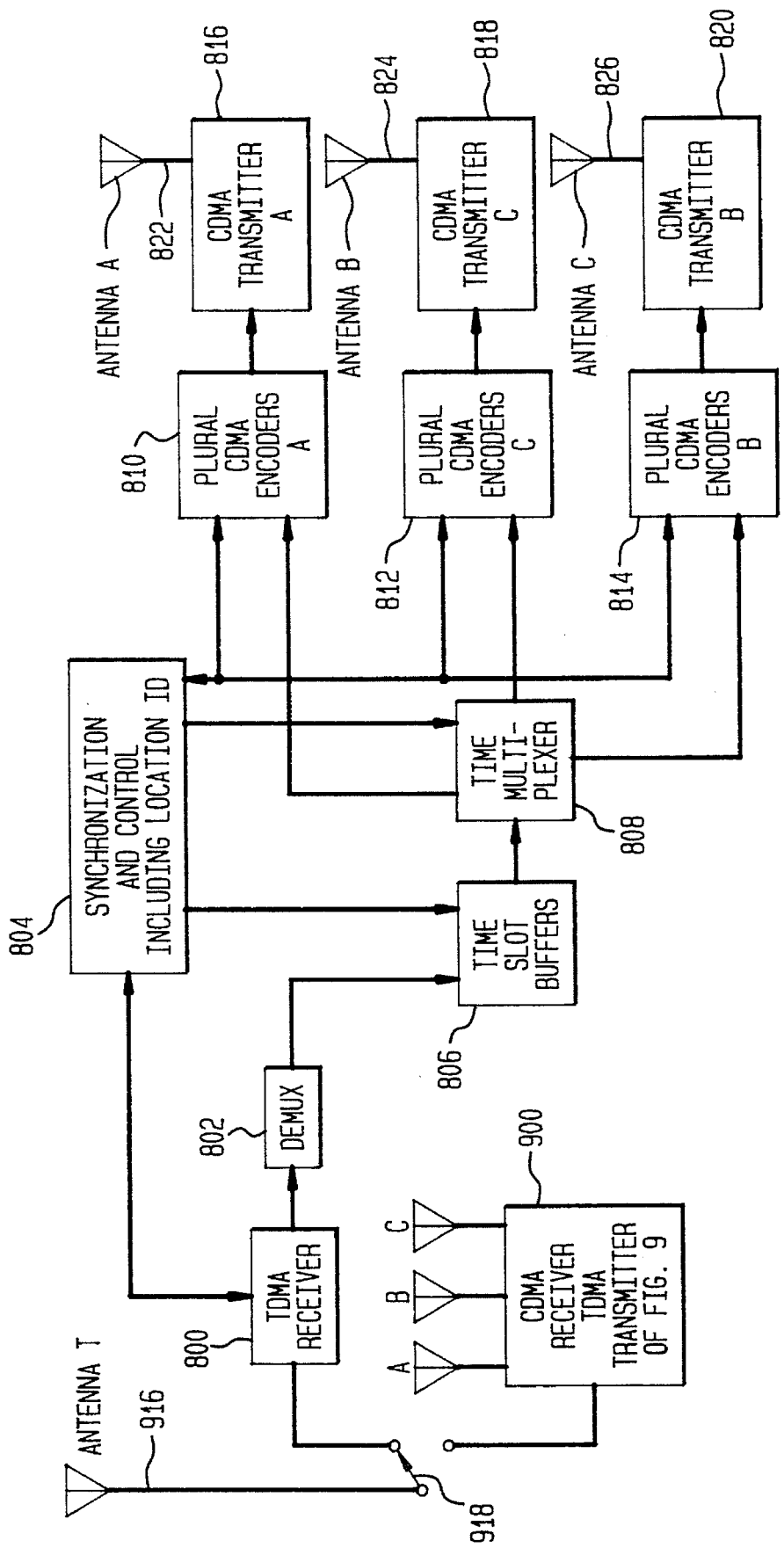
FIGS. 8 and 9 are a block diagram of a first embodiment of a transfer station in accordance with the present invention.

A block diagram of transfer station in accordance with the first embodiment of this invention is shown in FIG. 8 for the forward channel. The TDMA antenna T, 916, is coupled through a transfer receive switch 918, to a TDMA receiver 800. The output of the TDMA receiver 800 is coupled to a demultiplexer 802, the output of which is stored in time slot buffers 806. A time multiplexer 808 accesses the contents of the time slot buffers 806 and provides data packets output to plural CDMA encoders 810 intended for antenna A transmission. The output of time multiplexer 808 also provides data packets output to plural CDMA encoders 812 intended for antenna C transmission. Similarly, the time multiplexer 808 provides data packets output to plural CDMA encoders 814 intended for antenna B transmission. Each of the plurality of CDMA encoders 810, 812 and 814 are provided to respective CDMA transmitters 816, 824 and 826. Each of CDMA transmitters is coupled to a respective antenna 822, 824 and 826 to provide respective antenna A, antenna B and antenna C transmissions.

The coordination of the timing and control of the TDMA receiver 800, as well as the time slot buffers 806, the time multiplexer 808 and each of the plurality of CDMA encoders, is controlled by a synchronization and control apparatus 804. The synchronization and control apparatus 804 also provides a location identification (ID) representing the particular transfer station to the plurality of CDMA encoders 810, 812 and 814 for inclusion on the transmitted signals at antennas A, B and C.

Figure 9:
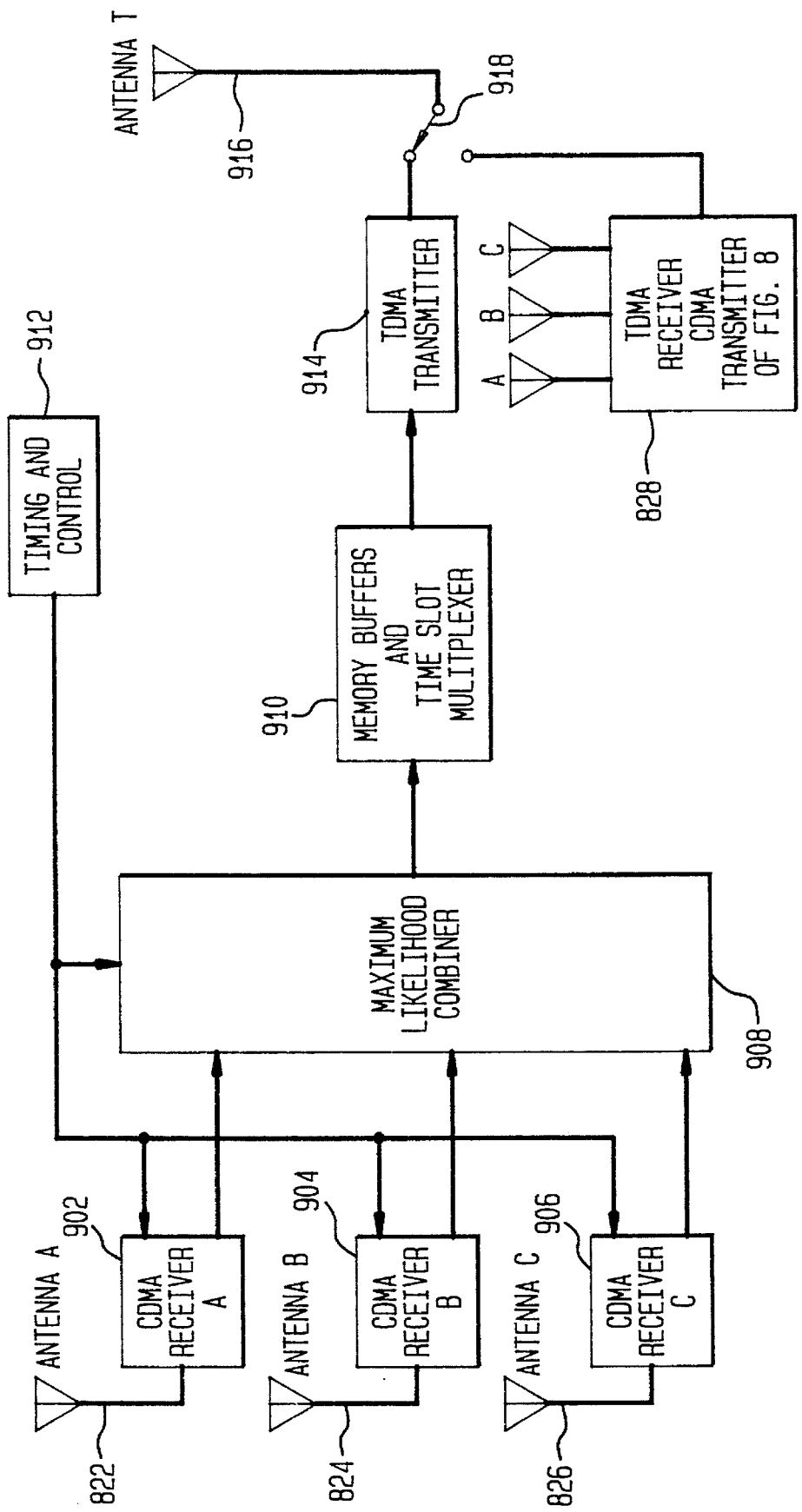

The transfer station of FIG. 8 also includes a CDMA receiver and TDMA transmitter 900, which is shown in further detail in the block diagram of FIG. 9. The TDMA transmitter is coupled to antenna 916 through transmit receive switch 918, while the CDMA receivers are coupled through respective diplexers to antenna A, antenna B and antenna C, as shown in further detail in FIG. 15.

FIG. 9 is a block diagram of a transfer station illustrating the structure of handling signals in the reverse channel. Antennas A, B and C, respectively shown as 822, 824 and 826 are coupled to respective CDMA receiver A, 902, CDMA receiver B, 904, and CDMA receiver C, 906. The output of the respective CDMA receivers A, B and C is fed to maximum likelihood combiner 908, the output of which is provided to memory buffers and time slot multiplexer 910. The memory buffers in time slot multiplexer 910 provide data packets to a TDMA transmitter 914 which is coupled through transmit receive switch 918 to antenna 916. The TDMA receiver and CDMA transmitter 828 corresponding to the block diagram of FIG. 8 is coupled to the other terminal of transmit receive switch 918.

Figure 15:
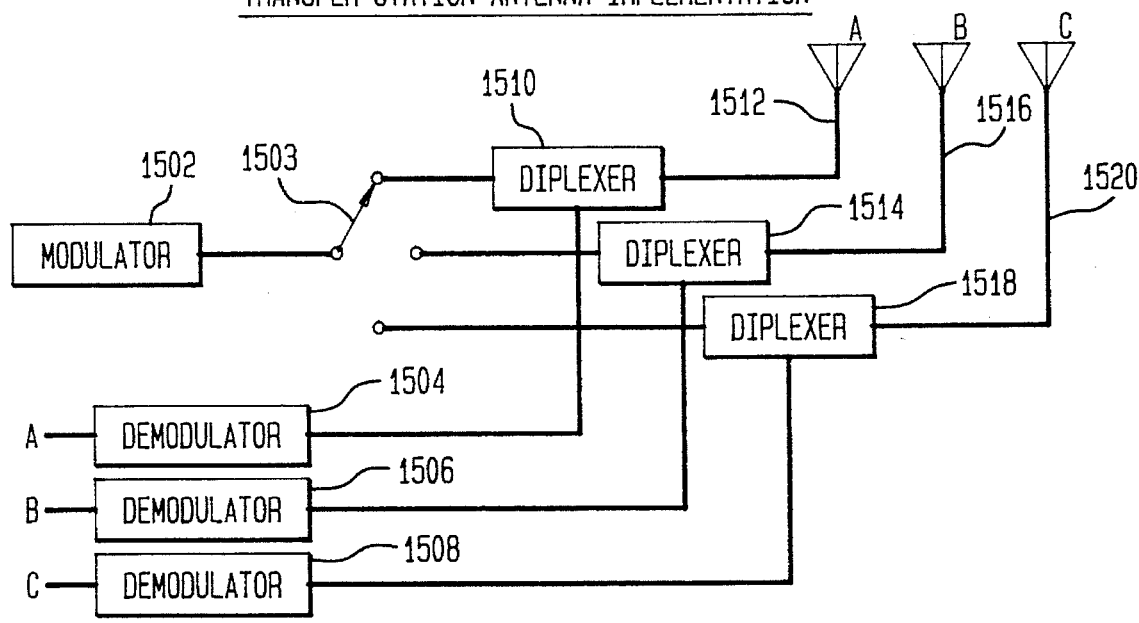
FIG. 15 is a block diagram of a transfer station antenna implementation.

FIG. 15 illustrates the antenna configuration of a transfer station permitting antenna A, antenna B and antenna C to be shared between TDMA and CDMA transmit and receive signals. Modulator 1502 is coupled through a time multiplexer 1503 to diplexers 1510, 1514, and 1518, respectively coupled to antenna A, 1512, antenna B, 1516 and antenna C, 1520. The other input of diplexers 1510, 1514 and 1518 is respectively coupled to the output of demodulator 1504, 1506 and 1508.

In the operation of FIG. 8, a TDMA signal received on antenna 916 is demultiplexed and placed in time slot buffers 806. A data packet intended for a given subscriber is selected by time multiplexer 808 during time slot 1 to encode a CDMA signal by one of plural encoders 810 for transmission on antenna A. The same data packet is again selected by time multiplexer 808 to encode a CDMA signal by one of plural encoders 812 during time slot 2 for transmission on antenna B. Finally, the same data packet is subsequently selected by time multiplexer 808 to encode a CDMA signal by one of plural encoders 814 for transmission during time slot 4 on antenna C.

In the reverse direction, and in reference to FIG. 9, the CDMA transmission from the subscriber station during time slot 3 is substantially simultaneously received on antennas 822, 824 and 826. Each of the CDMA receivers 902, 904 and 906 receive the same data packet. A maximum likelihood combiner 904 combines the power from all three time slots before making a hard decision. Generally speaking, the signal which is strongest and error free will be selected. After selection, the data packet is held in a memory buffer and time slot multiplexer 910 waiting to be placed in its appropriate time slot for transmission by TDMA transmitter 914 on antenna 916.

TRANSFER STATION—SECOND EMBODIMENT FIG. 12

Figure 12:
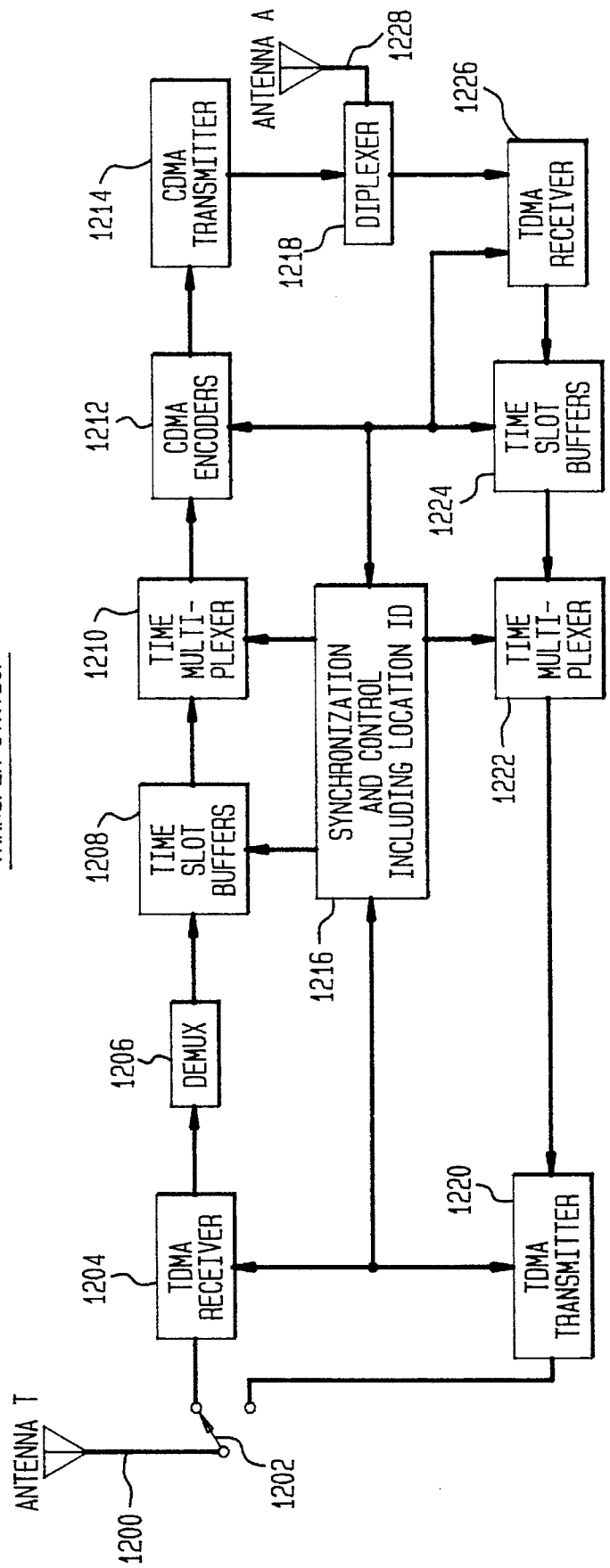
FIG. 12 is a block diagram of a second embodiment of a transfer station in accordance with the present invention.

A transfer station in accordance with the second embodiment of the present invention is shown in FIG. 12. In essence, this transfer station is similar to the transfer station of FIGS. 8 and 9 except that only one CDMA antenna, A, B or C, is provided. In particular, in FIG. 12 antenna 1200 is coupled through a transmit receive switch 1202 to a TDMA receiver 1204. The output of the TDMA receiver 1204 is demultiplexed in 1206 and placed in time slot buffers 1208. A data packet placed in time slot buffer 1208 is time multiplexed by multiplexer 1210 to one of a plurality of CDMA encoders 1212. The encoded CDMA signal is amplified in CDMA transmitter 1214, coupled through diplexer 1218 to antenna A, 1228.

Antenna A 1228 also operates to receive CDMA signals. Towards this end, a CDMA receiver 1226 is coupled to antenna A, 1228, through diplexer 1218 to provide received data packets in combiner and time slot buffers 1224. A time multiplexer 1222 takes the data packets in time slot buffers 1224 and composes a time multiplex signal to TDMA transmitter 1220 which is coupled through transmit receive switch 1202 to antenna 1200. The operation of the transfer station is controlled by a synchronization and control apparatus 1216 which also includes unique location identification (ID) for this particular transfer station, and call setup control parameters.

In operation, the transfer station receives TDMA signals on antenna T, 1200 which are demodulated in TDMA receiver 1204, and demultiplexed in demultiplexer 1206 for placement in time slot buffers 1208. The data packets in time slot buffers 1208 are transmitted on antenna A during time slot 1. Towards this end, time multiplexer 1210, CDMA encoders 1212 and the CDMA transmitter 1214 retrieve the respective data packets from time slot buffers 1208 and encode the appropriate data packet in a CDMA encoded signal on antenna A. On the return path, CDMA receiver 1226 receives signals simultaneously on antennas A, B and C during all time slots. The received data packets are demodulated by respective PN codes, and placed in time slot combiner buffers 1224, each time slot assigned to a different user. Thereafter, data packets are time multiplexed in multiplexer 1222 for transmission by the TDMA transmitter 1220 through the transmit receive switch 1202 on antenna 1200.

The Transfer Station is the conversion point for mapping the TDM/TDMA signal into a CDMA signal. The CDMA signal, when designed properly has superior performance against multipath interference. The input side of the transfer station is part of a structured distribution network. It is basically a tandem relay point in the network, that is, the address to the final CDMA user also includes the address of the intermediary point (the transfer station). Since, in the general case, the final CDMA user may move and access the network through another transfer point it will be necessary to provide the ability to enter the transfer station address independent from the CDMA users address. For fixed subscribers such as the TDMA subscriber station 40 in FIG. 2, this will not be an issue except for backup routing or for fade protection.

The preferred input network includes a number of base stations, transfer stations and TDMA user stations as shown in FIG. 2. Any time slot on any frequency could be assigned to any TDMA user or transfer station. To reduce the cost of the transfer station it is proposed that once a CDMA user is connected through a specific transfer station any additional CDMA users, assigned to that transfer station, also be assigned to a time slot on the same frequency as the first user. By properly managing these assignments the number of TDMA radio elements can be reduced significantly. The base station 24 or the switching center and central processor 22 will manage the radio resource and assign the frequencies, time slots and the PN codes, thus assuring efficient use of the spectrum and the radios. The frequency, time slot and PN code are all assigned during the initial call setup process.

The local transmissions on the output side of the transfer station are CDMA, but each subscriber is assigned a specific time slot of a time division signal. Therefore, the individual information rate is increased by the number of time slots. However, the total data rate for all subscribers stays the same and the total transmitted power for all signals remains the same, it is just redistributed. Since the individual time slots are turned off unless there is activity the transmitted power is reduced by approximately 3 dB for voice traffic. Because the same information is transmitted three times the average transmitted power is increased by 5 dB. Therefore, the total transmitted power from each transfer station is increased by 5 dB, transmitting three times, but also reduced by 10 dB, diversity improvement, resulting in a 5 dB overall reduction in average power. Overall, the interference introduced into other cells is reduced by 5 dB.

The base station (24 in FIG. 2) or the switching center and central processor (22 in FIG. 2) will also manage the handoff process. There will have to be at least four time slots to obtain diversity on the CDMA side and still have a time slot for the CDMA receiver to scan other transfer stations. Four time slots only provide dual diversity. With five time slots it is possible to achieve the desired level of triple diversity. Of course, by adding additional receivers in the CDMA user's terminal it will be possible to scan in parallel for better synch signals. However, adding another receiver in all the CDMA users terminals would be an expensive solution. Therefore, with three time slots there is only dual diversity and no handoff. With four time slots there is triple diversity for fixed CDMA subscribers and dual diversity for mobile CDMA subscribers. With five time slots there is triple diversity for both fixed and mobile CDMA users. With six or more time slots there is the opportunity to add flexibility to the channel structure. FIG. 7 shows the CDMA user terminal slot structure for six time slots.

The triple antenna structure at the transfer station is used on the return link by simultaneously listening to a single burst from each active subscriber, in his assigned time slot, on all three antennas, thus also achieving triple space diversity. The overall timing structure for the forward and reverse CDMA links, at the transfer station, are shown in FIG. 10A. For illustrative purposes six time slots have been shown, but as described previously any number of time slots, three or more, can be implemented, the upper reasonable bound being in the neighborhood of 32.

The order of transmission of the three active time slots can be distributed over the total number of time slots, and even more than three time slots could be used. With triple diversity the power transmitted from the CDMA user terminals can be reduced by at least 5 dB, probably more, but 5 dB is in keeping to match the performance of the forward link. In any case, the transmitted power is controlled and kept at the minimum level to maintain a high quality link. It is also possible, at higher frequencies, to achieve some antenna independence even on a relatively small radio or area. Therefore, a similar approach of the transmission space and time diversity, that is used on the forward link, may also be applied to the reverse link. Dual diversity should yield a significant improvement for most situations.

Each transfer station continuously transmits a spread spectrum channel for synchronization and control purposes. The synchronization and control channel identifies the particular transfer station and manages the user terminals as long as they are assigned to the transfer station. A large portion of the time the synchronization and control channel does not carry any user traffic. The synchronization and control channel can be a narrow band channel that can be easily acquired and tracked. The information bearing portion of the control signal has a preassigned time slot and includes system and signaling messages to all the users assigned to the particular area covered by that transfer station. The processing gain is sufficient to allow a transfer station to include several time slotted CDMA signals to be transmitted in parallel, thus allowing the antenna array to be shared. Also, only one synchronization and control channel is required for multiple slotted CDMA modules that are integrated at a single location.

SUBSCRIBER STATION FIG. 13

Figure 13:
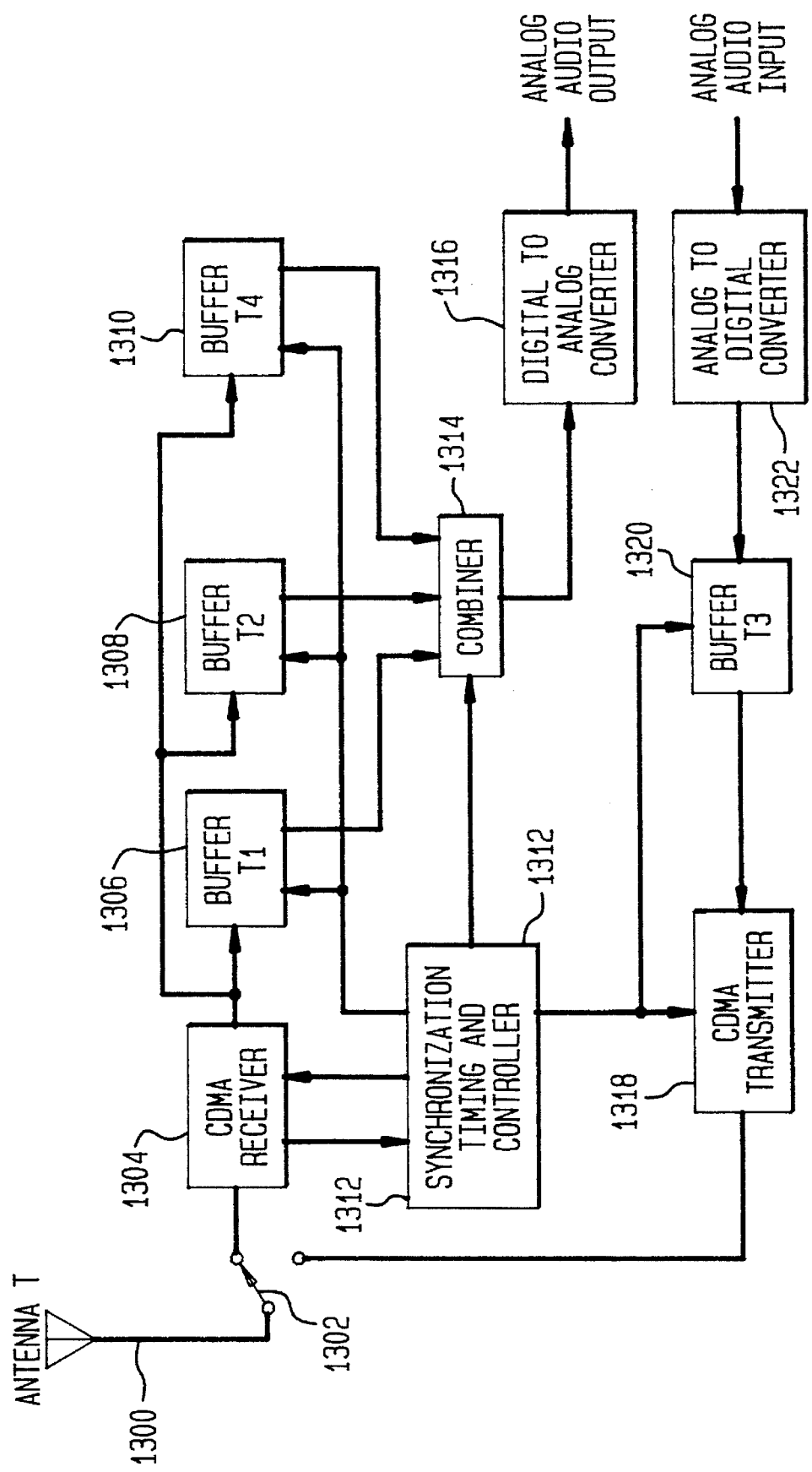
FIG. 13 is a block diagram of a subscriber station in accordance with the present invention.

A block diagram of the subscriber station in accordance with the present invention is shown in FIG. 13. Antenna 1300 is coupled to CDMA receiver 1304 through transmit receive switch 1302. The output of CDMA receiver 1304 provides data packets to data buffers 1306, 1308 and 1310. A combiner 1314 selects and combines the data held in buffers 1306, 1308 and 1310 to provide an output to a digital to analog converter 1316, which also includes means for decompressing the compressed signal to provide an audio output. An analog audio input is provided to analog digital converter 1322, which also provides means for compressing the audio signal. The output of the analog to digital converter 1322 is a digital form of audio samples assembled as data packets in memory buffer 1320. A CDMA transmitter 1318 encodes the contents of memory buffer 1320 and provides a CDMA encoded signal through transmit receive switch 1302 to antenna 1300. The CDMA subscriber station is synchronized by a synchronization and timing controller 1312, which also measures signal delay for location measurement, described below.

In the forward direction, CDMA receiver 1304 receives three identical data packets placing one of the data packets during time slot T1 in buffer 1306, a second of the data packets during time slot T2 in memory buffer 1308, and a third data packet received during time slot T4 in memory buffer 1310. The combiner 1314 selects one or more of the contents of the memory buffers to be combined or selected as the best received data to be converted to an analog audio output of the output of digital to analog converter 1316. By using three time and space diversity data packets, the present system is less susceptible to fading and since the same receiver is used to demodulate all three samples, no complex signal strength balancing process is required.

In the reverse direction, the analog audio input to analog to digital converter 1322, which also includes a digital compression algorithm, provides a data packet to buffer 1320. During time slot T3 the CDMA transmitter 1318 encodes the contents of buffer 1320 for transmission as a CDMA signal on antenna 1300.

The simplification of the CDMA user terminal is a major consideration in the present system. The main simplification is the ability to time share the receiver, and particularly the correlator as it performs its different functions. The ability to transmit and receive at different times also simplifies the implementation of the small portable user terminal. The single receiver sequentially receives the three space diversity signals in the three different time slots and then moves to different codes to look for improved signals from other transfer stations. The same receiver is also used for the purpose of acquisition and tracking. Since the user terminal does not receive during the slot when it is transmitting there is no need for a diplexer and notch filter. Only a simple on/off switch is used. Since only one PN code is needed at a time, the PN code generation process is also greatly simplified. The baseband processing can be accomplished on a relatively low speed common processor.

In those time slots where the user terminal is not receiving or transmitting the receiver is free to look for the synchronization and control channels from other transfer stations. When the user terminal identifies a synchronization and control channel that is better than the one he is assigned, the user terminal sends a message to the network controller telling the controller that he has identified a potential candidate for handoff. The network controller uses this input, along with other information, to make the decision to handoff. The network controller sends the handoff message to the effected entities. The identity of the codes that are to be searched by the user terminal are provided by the network central controller through the transfer station where they are placed on the control channel.

TIME SLOT STRUCTURE FIGS. 10A, 10B, 11A, 11B, 17

The time slot assignment for multiplexing 6 simultaneous calls is shown in FIG. 10A. Time slots assignments for transmission 1002 and for reception 1004 are illustrated. The entry in each box contains the activity during the corresponding time slot. During time slot 1, antenna A transmits T1 to user 1, antenna B transmits T6 to user 6 and antenna C transmits T4 to user 4. At the same time, antennas A, B and C receive R5 from user 5. During the next time slot 2, antenna A transmits T2 to user 2, antenna B transmits T1 to user 1 and antenna C transmits T5 to user 5. At the same time antennas A, B and C receive R6 from user 6. Continuing across the diagram in FIG. 10A, during time slot 3, antenna A transmits T3 to user 3, antenna B transmits T2 to user 2 and antenna C transmits T6 to user 6. At the same time antennas A, B and C receive R1 from user 1.

Note that during time slot 3, none of the antennas A, B or C is transmitting to user 1. Instead, user 1 is transmitting and the transfer station is receiving on all three antennas from user 1. However, during time slot 4, the third transmission to user 1 is transmitted. That is, during time slot 4, antenna A transmits T4 to user 4, antenna B transmits T3 to user 3 and antenna C transmits T1 to user 1. Time slots 5 and 6 are not directly used for data transfer to or from user 1. The time slot assignments shown in FIG. 10A, 10B, 11A and 11B are consistent with FIG. 7, wherein user 1 receives during time slots 1, 2 and 4, and transmits during time slot 3. The pattern can be seen in FIG. 10A slot assignments by looking for times when T1 is transmitted. Transmission of T1 appears in time slots 1, 2 and 4, on antennas A, B and C respectively. No transmission to T1 appears during T3, but reference to receiving time slots 1004 indicates that R1 is received from user 1 during time slot 3. Since in any given time slot, there are three transmissions and one reception simultaneously, at least 4 addressable CDMA PN spreading code sequences are required.

Thus, time division multiplexing is used in the sense that successive time slots carry data directed to different users. Code division multiplexing is used in the sense that during each time multiplexed time slot, multiple PN code sequences permit simultaneous communication with multiple users. The result is a time division multiplexed, code division multiplexed signal.

The time slot assignment for multiplexing 12 simultaneous calls is shown in FIG. 10B. Time slots assignments for transmission 1006 and for reception 1008 are illustrated. During time slot 1, antenna A transmits T1 to user 1 and T7 to user 7, antenna B transmits T6 to user 6, and T12 to user 12, and antenna C transmits T4 to user 4 and T10 to user 10. At the same time, antennas A, B and C receive R5 from user 5, and R11 from user 11.

The time slot assignment for multiplexing 24 simultaneous calls is shown in FIGS. 11A and 11B. FIG. 11A shows the transmission from the transfer station (forward direction), while FIG. 11B shows the transmission to the transfer station (reverse direction). Time slots assignments for transmission 1102, 1104, 1106 and for reception 1108 are illustrated. By way of example, during time slot 5, antenna A transmits T5, T11, T17 and T23 (i.e., T5 to user 5, T11 to user 11, etc. ) Antenna B transmits T4, T10, T16 and T22. Antenna C transmits T2, T8, T14 and T20. At the same time, (during time slot 5), antennas A, B and C receive R3, R9, R15 and R21 (i.e., R3 from user 3, R9 from user 9, R15 from user 15 and R21 from user 21).

For FIG. 10A, one CDMA encoder per antenna is required to handle 6 simultaneous calls. In FIG. 10B, two CDMA encoders per antenna are required to handle 12 simultaneous calls. Similarly, in FIG. 11A, four CDMA encoders per antenna are required. Thus, for example, if 180 PN code sequences are available, then 180/6 or 30 CDMA encoders per antenna are required to handle 180 simultaneous calls. If, for these larger number of required accesses, the number of time slots is increased, the number of encoders will decrease proportionally.

ALTERNATE SYSTEM CONFIGURATIONS
FIGS. 14, 16

A further enhancement extends the distance between the transfer station diversity antennas by using broadband cables that are a thousand feet or more. The transfer station sends the final radio frequency spread spectrum signal down the cable to the antenna. The antenna at the end of the cable contains a radio frequency amplifier. An implementation distributing signals by cable has the same improvement against blockage as described for the multiple transfer station transmission diversity approach.

Figure 14:
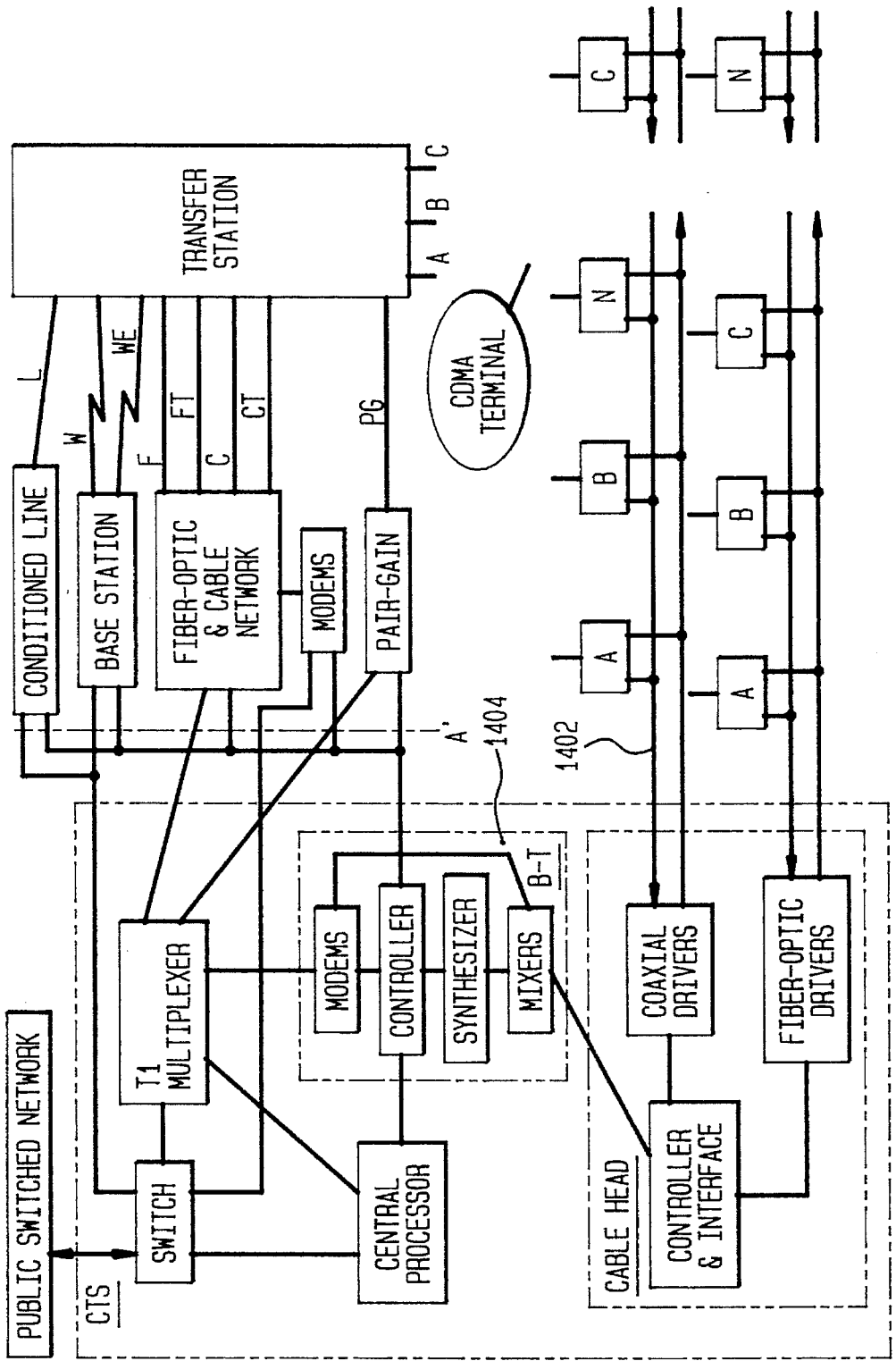
FIG. 14 is a block diagram of a centralized and integrated transfer station in accordance with the present invention.

However, instead of using a separate cable for each antenna, a preferred embodiment shares a single cable and uses frequency multiplexing to assign a different cable carrier frequency to each antenna. Thus, the desired signal is only transmitted from the antenna nearest to the user which reduces the interference. As a further enhancement, a cable distribution system integrates different elements into a local personal communications system network. The basic building block is the six time slotted CDMA module that serially drives three antennas to obtain triple transmission space and time diversity. For the sake of simplicity, the design of the transfer station handling the incoming TDMA signal also has a basic six time slot structure. The six time slot modularity can readily be deployed to accommodate multiples of 12, 18, 24, and 30 or 32. FIG. 14 shows the implementation for several different combinations. The preferred embodiment utilizes a wireless input, such as W or WE, as the input to the transfer station, however, a cable distribution system works equally well with hard wired signals as the input.

In a cable based personal communication system, the transfer stations are moved back to the central controller, which reduces the cost of the transfer station since it does not have to be ruggedized or remotely powered. It also reduces the number of spares required and the cost to maintain the units since they are all in one place and easy access. The transfer stations can also be dynamically reassigned as the traffic load changes during the day or week, thus significantly reducing the total number of required transfer stations. The bandwidth of the distribution network increases, but developments in cable and fiber optic distribution system have increasing bandwidth at falling cost to accommodate the increase in bandwidth at reasonable cost. The advantage of having several interconnection options to select means that the choice of interconnection becomes an economic choice determined by the cost factors associated with each installation. Each network is expected to include many or all of the interconnection options.

The system arrangement in which the transfer stations are moved back to the same location as the central controller, is depicted in the lower portion of FIG. 14. A general two-way cable or fiber optic wideband distribution system 1402 is used to link the centrally located transfer stations to the remotely located antennas. Considerable flexibility in configuring the wideband spectrum into signal formats is available for linking the centrally located transfer stations to each transfer station antenna. However, for simplicity it is preferable to retain the TDMA protocol with its time slotted CDMA triple space/time diversity air interface protocol, and frequency translate signal as a common air interface to each antenna.

Figure 16:
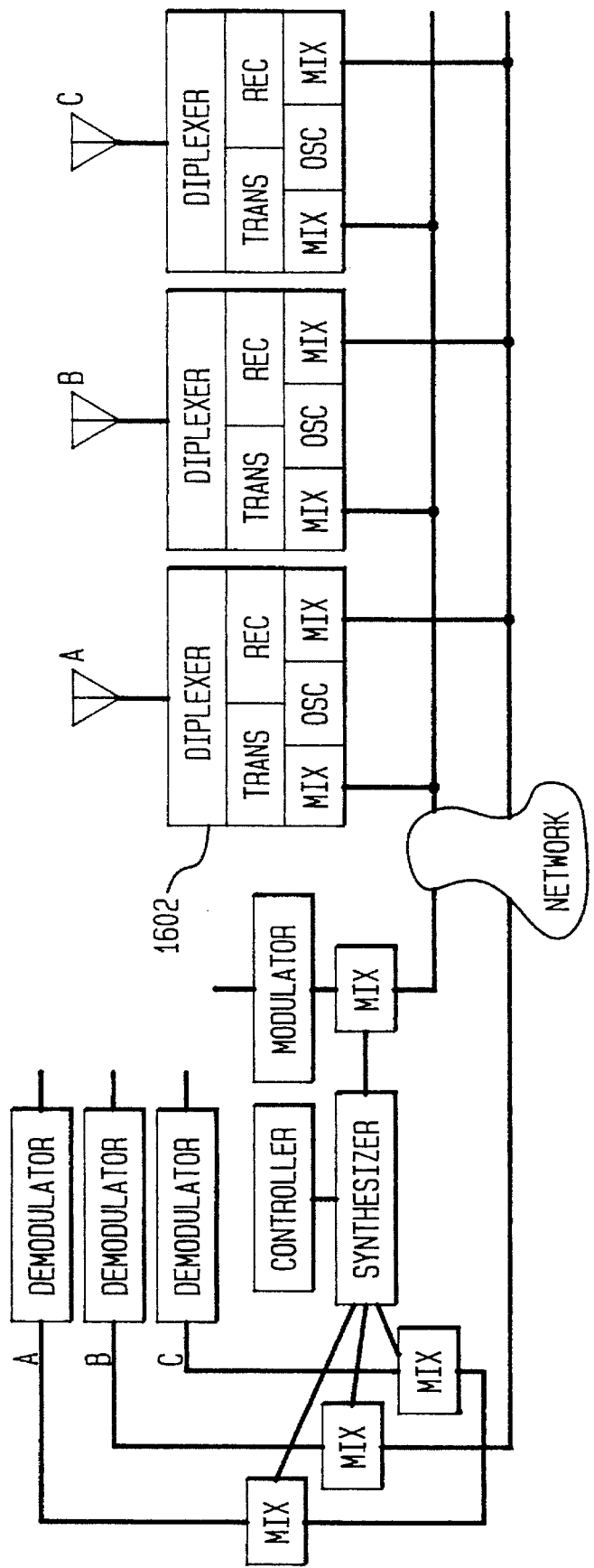
FIG. 16 is a block diagram of a distributed antenna implementation of the present invention using coaxial cable or fiber optic cable.

Each antenna is assigned a separate center frequency on the wideband distribution cable 1402. Due to the TDMA and CDMA sharing ability, many users can be served on the same antenna using the same cable frequency. The transfer station antenna at location N, includes a transceiver which is tuned to the assigned cable frequency. The central controller transmits and receives data packets in the final TDMA /CDMA waveform representing telephone traffic on each assigned frequency of the wideband distribution cable 1402. Thus, as shown in FIG. 16, each remote location includes a remote transceiver (transmitter, receiver, local oscillator, diplexer and antenna) at site 1602. The remotely located unit is a relatively simple receiver, frequency translator and low power transmitter, for both the forward and reverse directions. A low power transmitter amplifier is suitable because the cells are small and triple diversity (three antennas and three time slots) is being used to link the subscriber station to the system. The transmit side of the central controller provides individual information flows along with the associated signaling and control information at interface A' in FIG. 14, which is presented in assignable time slots in the form of packets.

The signaling information includes the called parties identification number(s), code, service profile and authentication code, etc. The control information includes routing information (i.e. which base station, transfer station, antenna designation), power levels, traffic on or off, handoff messages, etc. A large amount of this information is transmitted before the user information (telephone voice traffic) starts passing over the circuit, however, a significant amount of information is also passed during the time when telephone voice traffic is actually on the circuit. A separate control channel is required even after the connection to the user has been completed. The base station function translates this information into the protocol that is required to interface to the TDMA air interface and provides a TDMA radio spectrum at interface W. The transfer station converts the TDMA protocol to a time slotted CDMA triple space/time diversity air interface protocol and transmits this signal first on antenna A, then on antenna B and finally on antenna C (FIG. 14).

The centrally located combined base station and transfer station (B-T) module 1404 combines the base station and transfer station function and converts the signal appearing on A' to the time slotted CDMA triple diversity air interface. A B-T combined module may be achieved by direct combination of separate equipment, or the modules developed for the combined base station and transfer station use can be integrated. The CDMA signal branches at the output of the transfer station or at the output of the B-T module as shown in FIGS. 15 and 16. In the case of the of the transfer stations which are connected to respective antennas by three different cables, the output is just switched at the appropriate time. When one cable is used to reach all the antennas the output of the transfer station is frequency hopped at the appropriate time by changing the synthesizer frequency to the assigned frequency of the antenna. The B-T module is similarly frequency agile.

It is important to note the user information is replicated in each of the three time slots, but the PN code continues to run and is different during each time slot. Therefore, the repetition is not the same as in the case of imitation multipath or emulated multipaths. The PN generator just keeps on running without storing or resetting the sequence. Running the PN code continuously is simpler to implement as compared to starting a PN sequence anew.

In the foregoing discussion, it is assumed the time slots follow one right after the other; this is not necessary, however, as long as the receiver has a priori knowledge of the hopping sequence. In the preferred embodiment, the B-T transmits on two contiguous time slots and then listens to the response signal from the user terminal. During the user transmission time slot the user terminal tells the B-T module to not send the third diversity time slot if the first two time slots have given adequate performance and location measurement is not needed. The use of only dual diversity reduces the interference to the other users, and frees up the user receiver to perform other functions.

An alternate approach is to utilize a ⅓ forward error correcting code that is spread over all three time slots. The use of such coding provides improved performance if the error statistics during each of the time slots are nearly the same. If one time slot becomes significantly worse, and it can be identified as being bad, it may be better to ignore the bad time slot and request an antenna handoff to replace that time slot if the poor performance continues. Since it is expected that the real diversity channel statistics will result in unequal time slot statistics, the preferred alternative is to not use a forward error correcting code over the three time slots. Even though error detecting and correcting codes are only included within each time slot, forward error correcting codes may be used over multiple time slots.

Each antenna, assuming there is data to transmit, transmits during each of the time slots. Since the data is transmitted three times there will be three CDMA signals transmitted in each time slot for each module assigned to that antenna. If there are 4 modules assigned to the antenna, 4 modules supports 24 users at any one time, there would be 12 CDMA signals emanating from the antenna in each time slot, (see FIG. 11A, 11B). If the duty factor is approximately 50% then only six CDMA signals will actually be transmitting and if 20 to 25% of the time the third time slot is not required only 4 to 5 CDMA signals would be transmitted at a time. The same antennas are used for the receive side, or reverse link, (user to transfer station).

As stated previously the user CDMA terminal transmits only during one time slot and the transfer station simultaneously receives that transmission on the same three antennas resulting in receiver triple space diversity. The three receive signals come into the transfer station, or B-T module, either on separate wires or at different frequencies, as shown in FIG. 15 and 16, and are processed separately. These processed signals are summed together using maximum likelihood combiners. The S/I from each antenna path is measured and kept in memory over an interval of at least ten time slots. The record of signal statistics is used by the maximum likelihood combining process. Stored signal statistics are also useful in the decision process for executing handoff to other antennas.

The handoff process for the B-T cable network is based on the signal received from each of the antennas. The central processor receives information on the quality of the links in both directions. On the forward link it receives information from the user CDMA receiver operating on that link during an assigned time slot which is identified with a particular antenna. On the reverse link it receives information on the separate paths through different antennas. The information on the quality of paths through a particular antenna can be evaluated and compared to other current paths through different antennas and with other new paths that the user terminal is continuously searching. When a current path in a particular time slot continues to deteriorate and a better path is available the central controller assigns a new path (antenna) to the user terminal and notifies the user terminal it has done so.

The handoff process for the transfer station is similar except the handoff is generally between transfer stations rather than antennas. When handed off from transfer station to transfer station all three antennas associated with a particular transfer station are handed off with the transfer station. A few transfer stations may be implemented with widely separated antennas. In the case where there are transfer stations with widely separated antennas the handoff process described for B-T module could also be used.

Operational Description: A new subscriber turns on his CDMA user terminal and scans the synchronization codes until he acquires a synchronization code. The CDMA user terminal then initiates a registration message. The transfer station receives this message and passes it to the central controller who acknowledges it with an acknowledgment message back to the user terminal. The central controller goes to the home register of the new terminal and obtains the user profile and places it in the file for active users. The new user is now registered and all calls will be forwarded to this new region of service.

There are 28 different synchronization codes and one synchronization code is assigned to each area. The 28 areas make up a region and the codes are repeated in the next region. The transfer stations within an area are given different shifts or starting points for their particular code. Therefore, each transfer station, or widely separated antenna, has an identifiable code. The central controller knows which antenna, or transfer station, that the new user registered through so the controller will route all information to the new user through that node. The central controller will also give the new user a set of codes, or different starting points on his current code, to search for the purpose of identifying diversity paths or handoff candidates. The new user continues to monitor the synchronization and control channel during half his time slots. The other half of his time slots he scans for better synchronization channels.

The user is paged on the control channel and given a CDMA and time slot assignment which he sets up so he will be ready for the beginning of the call. When the user requests service he is also given a CDMA code and time slot assignment for the duration of the call. The user terminal remains in this state until the end of the call, unless the signal in one or all the diversity paths becomes weak. Since the user receiver is continuously evaluating the incoming signals and scanning for better new paths, it will know if a path is going bad and will notify the central controller of this condition along with a list of better candidates. The central controller will order a handoff and the user terminal will go to the new CDMA code and time slot. None of this activity is detectable by the end user.

At the beginning of each time slot is a short unmodulated section, without user information, used for resynchronization and range adjustment, followed by a short control message section. These short bursts are sent whether there is user information to be sent or not. If no user information is to be sent the control message confirms this and the transmitter power is reduced by ten db. for the user information portion of the time slot. It should be noted four time slots are available on the forward channel for passing user information depending on what agreements have been established between the user and the central controller. These slots as described above can be turned off so that other users have access to additional capacity. The multiple time slots can be used for diversity improvement or sending increased data rates, multiple data channels or a graphics channel along with a voice channel. The possibility of extending several parties on a conference call is also possible.

LOCATION PROCESSING FIGS. 20, 21, 22, 23

FIG. 20 shows the radio links of FIG. 1 or FIG. 4, where the car and its antenna are represented by user antenna U. The radio links are time slotted as shown in FIG. 10A. The radio link AU is time slotted and is present during time slot 1. Radio link BU is also time slotted and is present during time slot 2. Radio link CU is also time slotted and is present during time slot 4. Radio link AU establishes the absolute range from U to antenna A. The range to antenna A forms a reference to measure the difference in path lengths between radio links AU and BU. Similarly, the path length of radio link AU is also used as a reference to measure the difference in path lengths between radio links AU and CU.

Since the time occurrence of the all ones vector (for synchronization) is the same at all three antennas, the ranges to all three antennas may be derived from the difference in respective arrival times of the all ones vector within each time slot. The location center, having the physical geographic coordinates of all three antennas, calculates the location of the users antenna U.

The geometry of location determination is shown in FIGS. 20, 21, 22 and 23. The first range measurement AU establishes the user as someplace on circle A in FIG. 21. The second range determination establishes the user as also being someplace on circle B. The only locations this can be true is where the circles intersect each other at points X and Z. Therefore, his location has been narrowed down to two possible points. The third range determination establishes the user someplace on circle C. Since the user is also on circle C, he must be at point Z. Obtaining additional ranges to other antennas confirms the first set of measurements and in many cases improves on the accuracy. If the terrain has significant variations in height the constant range circles become constant range spheres and the extra measurements remove any ambiguity that could be caused by adding the third dimension. The position location processing center converts these coordinates into user friendly instructions. Range measurements by the CDMA system are obtained as follows:

1. The pseudo noise code as it is stretched out between A and U to act as a yardstick. The time required to propagate between A and U allows many chips, the propagation time in microseconds times the chip rate in megachips, to represent the length of the link or be "stored" in the link during signal propagation. See FIG. 20.

2. There are two ways to increase the number of chips stored in the propagation path. One is to increase the path length and the other is to speed up the chip clock rate. Increasing the chip clock rate is analogous to marking a ruler in a smaller scale. Therefore, increasing the chip clock rate stores more chips in the path delay and makes it possible to make more accurate measurements.

3. The path length from antenna A to user terminal U and back to antenna A, can be measured by transmitting from A, then retransmitting the same PN code, with the arriving phase, from user terminal U, and comparing the repeated signal as it is received back at antenna A to the signal that was previously transmitted from antenna A. By delaying the original signal until it matches, chip by chip, the received signal, at A, and counting the number of chips that are slipped, the total delay is proportional to twice the distance between antenna A and antenna U.

4. The accuracy of the distance measurement is approximately ¼ of the number of feet represented by one chip. The ¼ chip is an implementation constraint determined by how precisely the correlation peak is detected and tracked. It is possible to reduce this error by autocorrelation techniques, but ¼ chip is a realistic resolution.

Figure 22:
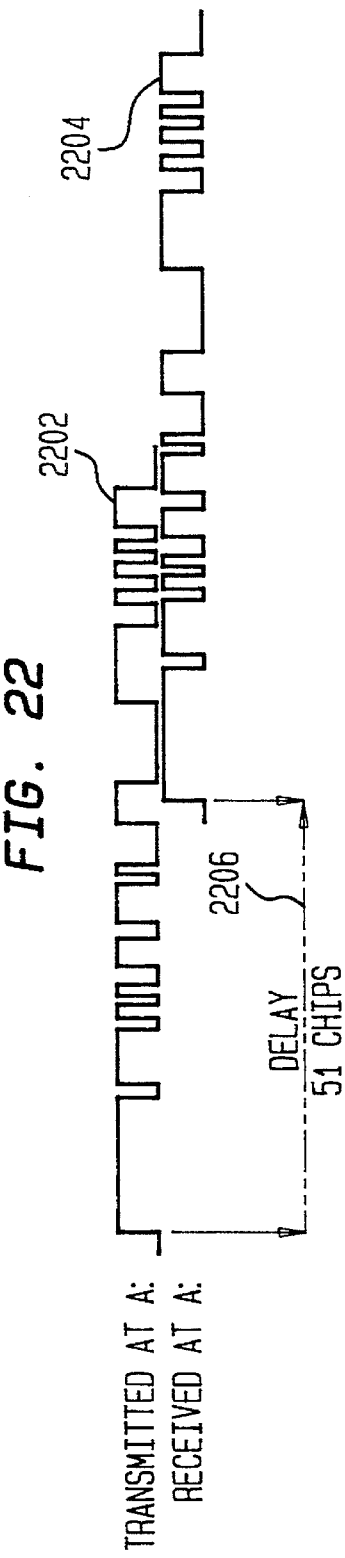
FIG. 22 is a timing diagram illustrating a method for determining the distance from a subscriber station and to a transmitting transfer station.

5. To determine the path length between antenna A and user terminal U, described in paragraph 3 above, FIG. 22 shows the signals 2202 transmitted and signals 2204 received at antenna A. At a chip clock rate of 10 megachips per second, there are approximately 100 feet represented by each chip. The delay of 51 chips between transmitted 2202 and received 2204 signals represents the time required for a radio wave to traverse a round trip between the subscriber station and the transfer station. One half of the round trip delay, or 25.5 chips represents the distance to the antenna. Thus, the distance from antenna A to user terminal antenna U for the example in FIG. 22 is (51×100)/2=2550 feet. The distance measurement accuracy is plus or minus 25 feet (100 feet/4).

6. Thus, the distance AU is measured quite precisely. As described previously the receiver uses a single receiver for all time slots. While the subscriber receiver is listening to time slot one it is working in conjunction with the base station, to repeat the received waveform, same phase with no delay through the user terminal. The base station receiver, as described above, compares the received phase with the transmitted phase to determine absolute range. The base station then transmits the range value, thus measured, to the user terminal where it is stored for future retrieval and use. As noted above it is the waveform phase that is important, if the starting point, the all ones vector, is maintained through the user terminal, a new similar PN code may be substituted on the reverse link. A similar code could include that same code shifted by a defined offset.

7. The same forward and return measurement process described above, could be used to obtain the other two ranges (to antennas B and C) with the results also stored in memory at the user station. However, direct range measurement to all three antennas is not necessary. See FIG. 23. The same receiver retrieves information over all three paths. In so doing, the receiver adjusts for the difference in path length at the beginning of each time slot. Once the adjustment is accomplished, on the first time the receiver uses this antenna as an information channel, the code is stored and retained in memory until the radio returns to this time slot whereupon, it is taken from the memory and used as the starting point for the tracking loops. Therefore, the receiver is essentially maintaining three separate sets of receiver parameters, emulating three different receivers, one set of parameters for time slot 1, a different set for time slot 2 and still a different set for time slot 3. The distances to antenna B and antenna C can be determined by adding or subtracting the offset, measured in chips, from the absolute range value measured on link AU. Actually the offset is determined before the time slot is used for the first time as an information channel, this determination is made in the process of looking for new paths for handoff. The delay and measure of signal quality is determined and maintained in the potential handoff targets file. These delay offset measurements are also used as additional range measurements in the position location process.

In particular, continuing the above example, the signal 2302 transmitted at antenna A represents a range of 25.5 chips from antenna A to user terminal antenna U. Signal 2304 received at antenna U from antenna A is used as a reference to measure the relative time of arrival of signals from antennas B and C, adjusted for the different time slots in which these signals are placed.

Figure 23:
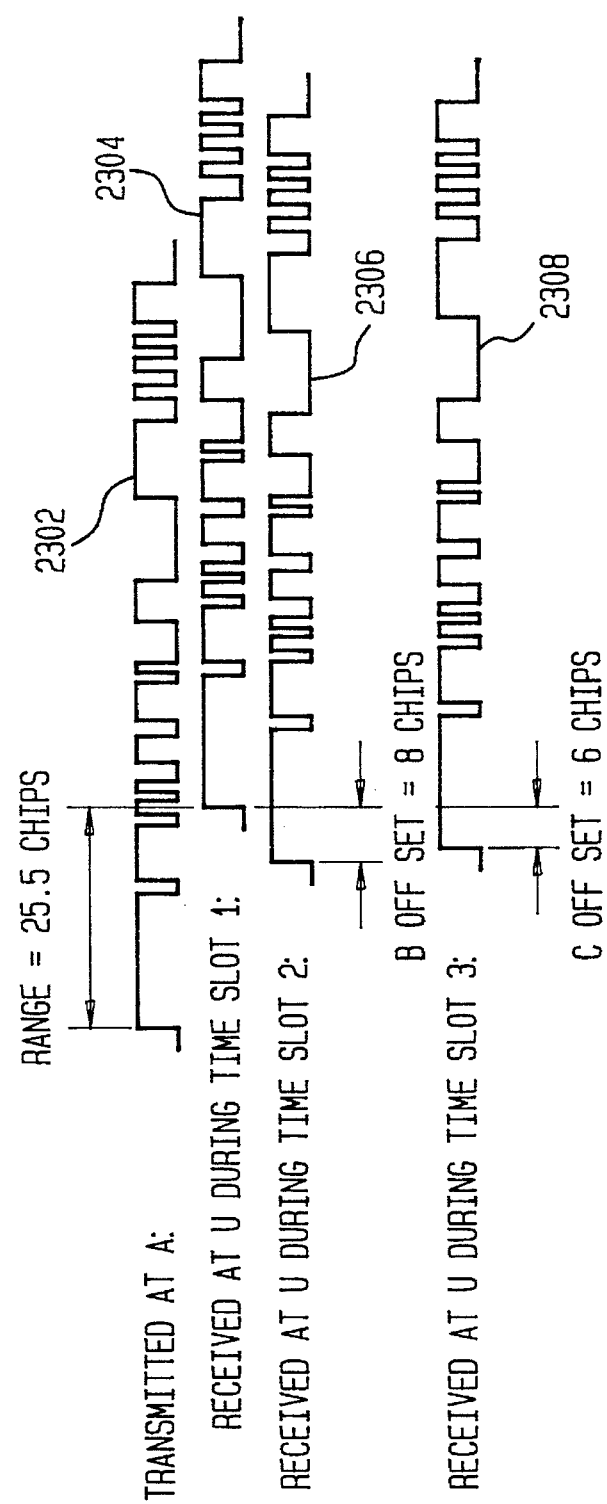
FIG. 23 is a timing diagram illustrating a method for determining the relative distances from a subscriber station to two transmitting transfer stations.

Since timing for time slots 1, 2 and 3 is sequential, the real time chip patterns for slots 2 and 3 do not overlap. However, after adjustment for time slot delays, the timing relationship is as shown in FIG. 23. Thus adjusted for the time slot difference, signal 2306 received from antenna B at user terminal antenna U, is received in advance (i.e., offset relative to the signal from antenna A) by 8 chips. Similarly, signal 2308 received from antenna C at user terminal U, is also received in advance (i.e., offset relative to the signal from antenna C), but by 6 chips. Received signals may be either delayed or advanced (i.e., have a positive or negative delay) relative to the reference signal 2304. Receipt in advance indicates that the antenna (B or C) is closer than antenna A. Conversely, a delayed receipt indicates that the antenna (B or C) is further away than antenna A.

In FIG. 23, the range from antenna B to antenna U is 25.5−8=17.5 chips. In feet, 17.5 chips is 17.5×100=1750 feet, the length of path BU. The range from antenna C to antenna U is 25.5−6=19.5 chips. In feet, 19.5 chips is 19.5×100=1950=path length CU. The user terminal may be located at Z, the intersection of circle A at 2250 feet from antenna A, circle B at 1750 feet from antenna B and circle C at 1950 feet from antenna C.

In the alternative, location measurement may be accomplished by computing the intersection of two hyperbolas. The first hyperbola is the locus of all points having a fixed difference in distance from two foci, which is proportional to the difference in delay between antenna A and antenna B. The second hyperbola is the locus of all points having a fixed difference in distance from two foci, which is proportional to the difference in delay between antenna B and antenna C, (or antenna A and antenna C). Antennas A and B are the foci of the first hyperbola, while antennas B and C are the foci of the second hyperbola. In such manner, subscriber location may be computed without requiring a two way exchange between the user terminal and the transfer station to establish a first range measurement.

LOCATION SERVICES FIGS. 18, 19

Since, the subscriber station receiver is receiving information over three different paths that emanate from known locations, position location information is derived by measuring the time of arrival of messages relative to a fixed time reference. The measurement accuracy depends on the chip rate, but at a chip rate of 10 megachips per second it is quite accurate. There are several ways location measurement and display can be accomplished, depending on how much processing is available in the user terminal. The choice also depends on who will actually use the information. It could be fairly passive, using only the relative chip offset information and obtaining a reference from the current cell. The user could locally derive and display his location, similar to using a GPS satellite. A GPS receiver displays longitude and latitude reading. Location information may also be sent back to a processing center that provides a service to the user. The processing center converts the longitude and latitude coordinates into a location having geographic meaning, such as, a block number on a specific street.

Local geographic position measurement is particularly attractive to people concerned about security and health problems. The manager of the service center could either notify the police, family designate or the service center could include, as part of a special service rate, the staff to check on irregular circumstances. Of course, the service center can also, for a nominal fee, tell an individual his street location and give instructions on how to get to a desired destination address. These services can be provided to users who are pedestrians or moving along in vehicles. The destination instructions can be in the form of a set of one time detailed directions, or specific and continuous intersection prompting as the user travels the suggested route. The prompting could take the form of a voice command, or text display, telling the user to turn right at the next intersection. A delivery truck, cab, ambulance or fire truck could have a special screen that showed a local map with instructions written on it. The instructions can also be modified as the traffic congestion changes. The benefits of the present system are a significant increase in public safety, convenience and productivity.

In the system configurations described previously, the separation between antennas is made sufficient to yield an accurate position location capability. By positioning the antennas to obtain independent paths sufficient to avoid flat fading due to interfering obstacles, then the separation is also sufficient to reduce the triangulation error to a very small number. The incremental cost of including optimization for a location capability is nominal.

Position location processing is accomplished by a third party provider which owns and manages the position location center. Location service can be accomplished in several ways. The preferred approach is to make the user terminal the repository for all location information by building and maintaining a location file. The position location center queries the user terminal over the normal public switched telephone network (preferably packet) when it needed information. Preferably, a provision for encryption during transmission and an access code for privacy is used. The user terminal could also send location information to the location center, also over the public switched telephone network, responsive to user activation. For instance, when the user pushed an alarm button, the radio sends the alarm message, along with the location information, to the location center. The location center would respond according to prearranged directions and the level of subscribed service. Since the user terminal radio develops the code offset information internally, the only additional information the cellular system needs to provide to the user terminal is the distance, one way or round trip, from the user to one of the base station/antennas. The distance information, which would be provided as a service feature to the user, must identify the base station/antenna. All the measurements must be performed within a time window of 100 milliseconds or the error as a result of vehicle movement between measurements could become excessive. For stopped vehicles or pedestrians the time window to perform location measurements could be much longer since there is little or no movement between measurements. Therefore, the distance measurement sent by the system to the user terminal includes the distance in feet, the time in milliseconds and the identity of the measuring entity. Upon receipt of the distance message the user terminal stores the message and makes code offset measurements to several different antennas, and, if signal levels are adequate, stores the composite information in the location file. The location file is retained until a new distance message is received by the user terminal radio, whereupon the user terminal radio again makes the code offset measurements and updates the location file.

When the location center queries the user terminal radio as to its location, the radio sends the contents of the location file. The location center processes this data into very accurate map data, position on a particular street (can be displayed on a typical street map) The system measures distance to the subscriber normally once every minute when the subscriber is in the active receive mode, receiver on, waiting to be paged. The period between measurements is variable and can be adjusted according to the needs of the user. The system sends this new distance to the subscriber station which places it in the file and enters new code offset measurements with it. If the subscriber is engaged in a conversation, the user terminal is transmitting, the base station makes a measurement every ten seconds and if the distance changes more than one hundred feet the system sends a message to the subscriber station. Whenever the user terminal receives a distance measurement it adds the local code offset measurements and updates the file.

It can be seen the user terminals location file is updated at least every minute and more often if warranted. Therefore, the system can know the location of any active user within a distance of approximately 100 feet. Better accuracy and more frequent updating is certainly possible, but due to the loading on the data links the number of subscribers receiving higher performance should be the exception rather than the rule. Whenever the user presses the alarm button on his portable terminal, the terminal transmits the contents of the location file three times which is long enough for the system to read a new distance and send a message to the user terminal. The user terminal makes several offset measurements and sends the new location file three times. The alarm message is repeated every thirty seconds until the battery goes dead. The user terminal radio can have a module added (with its own battery) that emits an audible tone whenever the radio alarm message is transmitted.

The system generates raw location information at the user terminal that needs to be converted into human readable map data. In general, the basic longitude, latitude, or angle and distance readings are fine. However, there is a need for a third party to translate this data into a format that is quickly usable by the mass public, as a service business. Since the user terminal has the basic location information, it can be provided to any authorized entity that requests it from the user terminal. The location processing center periodically queries the subscribed user terminals and maintain a file on their current location. One potential service for subscribers with health problems, is a monitoring system during exercise. If the subscriber stops in an unusual location for an excessive length of time and does not press the alarm button, the location center operator could request life signs or send a medical technician to the paused subscriber. If there is an emergency, the location center operator knows the subscriber location in order to send help. On the other hand, when the alarm button is pressed, the alarm message is addressed to the location center where they are equipped to handle such emergencies. The capability to track user terminals and provide help as the result of some action is useful for many applications. Tracking stolen cars, identifying congestion, keeping ambulances from getting lost and reporting vandalism are but a few examples of the application of the present invention.

The system does, particularly in its distributed configuration as described previously, require a consistent zero time reference across the different base station antennas. Having a zero time reference available significantly reduces the time to resynchronize as the signal hops from antenna to antenna and also aids in the search and handoff process. The location application capability described above allows the system to periodically perform a self calibration by placing several of the user terminals, as described above, at fixed locations and determining the proper zero time setting for these locations. By keeping the correct answer in the central processor, as the system scans these check points, it will get an error indication if the system is out of calibration. The same check points are used to show the effective delay, during the process wherein a variable delay is introduced by incrementing or decrementing the system delay in one or more of the signal paths in the recalibration or adjustment process.

The calibration process could be easily automated. Automation could be implemented in two ways. The first approach is to scan the check points every minute and determine any error that has developed. If this error reaches a significant level the communication system contacts the location center and provides the center with the corrections that need to be factored into the position location calculations. The latter approach requires close coordination between the communication system and the position location center. A more autonomous approach would be desirable. The communication system itself could maintain the proper "zero" state by scanning the check points, as described above, and by having the ability to insert or remove delay 1806 in the path to the antenna.

Figure 18:
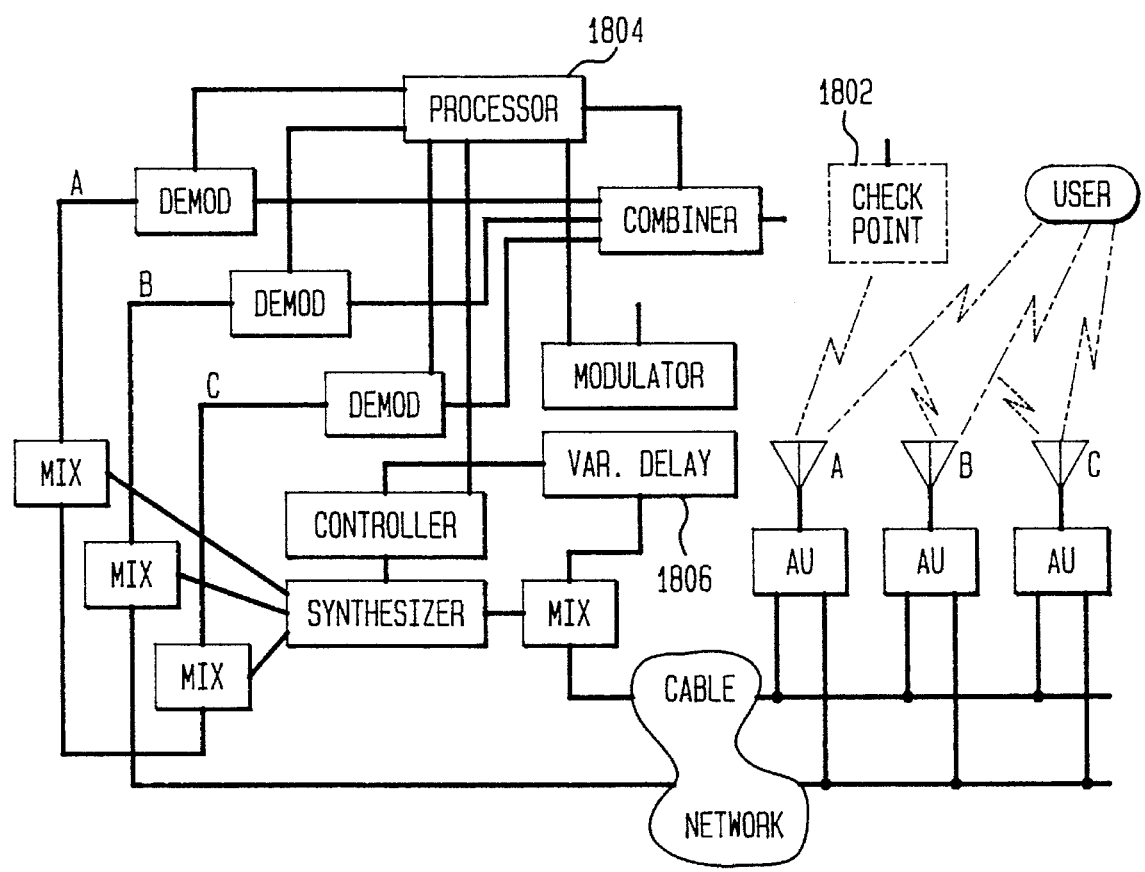
FIG. 18 is system diagram illustrating a distributed antenna implementation of the present invention.

FIG. 18 illustrates a system with self-calibration. Once every minute the system queries each check point 1802. This results in a distance measure being sent to the check point 1802 where the check point receiver adds the code offset measurements and sends the contents of the location file to the processor 1804 where the received file is compared with a file that contains the correct measurements. If the difference exceeds the threshold the processor 1804 calculates the changes in delay that are required to bring the measurements within tolerance and passes the correction to the controller. The controller maintains a file that includes the variable delay 1806 to be inserted for each antenna. The controller changes the delay entry in the file and a new measurement is taken to validate the calibration. Changes that require significant changes in delay are unlikely, but if this should happen the controller would not initiate any measurements that include the leg that is under recalibration. Thus, the position location capability also provides a service for the communication system. Self calibration results in a significant reduction in installation cost and allows the use of more economical system components.

Location related communications between the antenna devices and the subscriber terminal can be broken into several different links. The functions that are performed by these different links are: 1, distance measurement (requires a two way link, but no traffic); 2, sending measurement information to subscriber terminal (one way data link, except for possible retransmission requests); 3, measuring code offset (only requires user terminal to listen, no data is transferred); 4, Transmit location file to location center or communication processor 1804 (data links can be either one way or two way). Distance measurement can only be performed by the system and since it requires a two way link it can be done while a normal conversation channel has been established or if the terminal is in the listening mode the system has to establish a short round trip connection.

The two way link is required because the base station measures the code phase difference between the signal it sends to, and the signal it receives from, the user terminal. In FIG. 18 the foregoing function is accomplished in processor 1804. In this sense, the system operates like a radar with a pulse the width of a PN chip. The one way data link message transporting the distance message to the user terminal, is a single message that typically will include an error correcting code, and may also require an acknowledgment message to be sent back from the user terminal to the base station. The acknowledgment message could be sent independently or appended as part of the distance measurement function.

The code offset information is also placed it in a file that is accessible from outside the system. As described previously the user terminal time shares one receiver on the three independent paths that emanate at different times from the three different antennas. Therefore, the receiver tracks three independent paths one after the other. The PN code on each path is the same, and as described above the code has the same starting time at each antenna, but because of the difference in distance to the three different antennas, from the user terminal, the codes arriving at the user terminal are of different code phases. However, since the system cycles very rapidly from antenna to antenna, the receiver cycles between signals received from each of the antennas. Therefore, the receiver maintains three separate starting states and tracking loops for the different time slots. At the end of each time slot, the exact time is known in advance, the previous state is stored in the computer and restored at the beginning of the next time slot assigned to the same antenna. Thus, the processor is emulating three different receivers. The receiver quickly adjusts for any slight drift that occurred while the receiver was locked to the other antennas. Note that the receiver has a specific starting state. Thus, the PN sequence has been shifted to compensate for the difference in range on the path between the user terminal and the first antenna and the path between the user terminal and the second antenna. The difference is the code offset, because the code offset measures the difference in range. Thus, the distance to the second antenna is known without having to do a closed loop (two way) measurement. The same process is followed for the third antenna.

Additional entries, greater than three, in the location file are available using the normal search mode that the user terminal radio uses to identify potential candidates for handoff. The user terminal radio searches the pilot codes emanating from nearby antennas to determine if any of these antennas have better signals than one of the three that are currently being used. If so, the user terminal notifies the system that a good candidate is available. The process of searching starts at the state of the PN signal coming in from time slot number one and if nothing is found at that state the radio adds a chip to the path length and integrates again. The radio keeps adding chips until it finds a signal or exceeds a range threshold. If it exceeds the range threshold it resets the PN generator to a new pilot code and starts at the 0 offset distance again. Therefore, when the radio finds a new pilot signal it knows how many chips it added before it was successful. The added number of chips is also the code offset. The code offset value along with the identity of the code, which uniquely names the antenna, and the time stamp are entered into the location file. The radio places these entries in the location file even if they are not better than the current signals. As the radio scans and finds new antennas it places the four best results in the location file. As it continues to scan, older entries are replaced with newer better entries.

Figure 19:
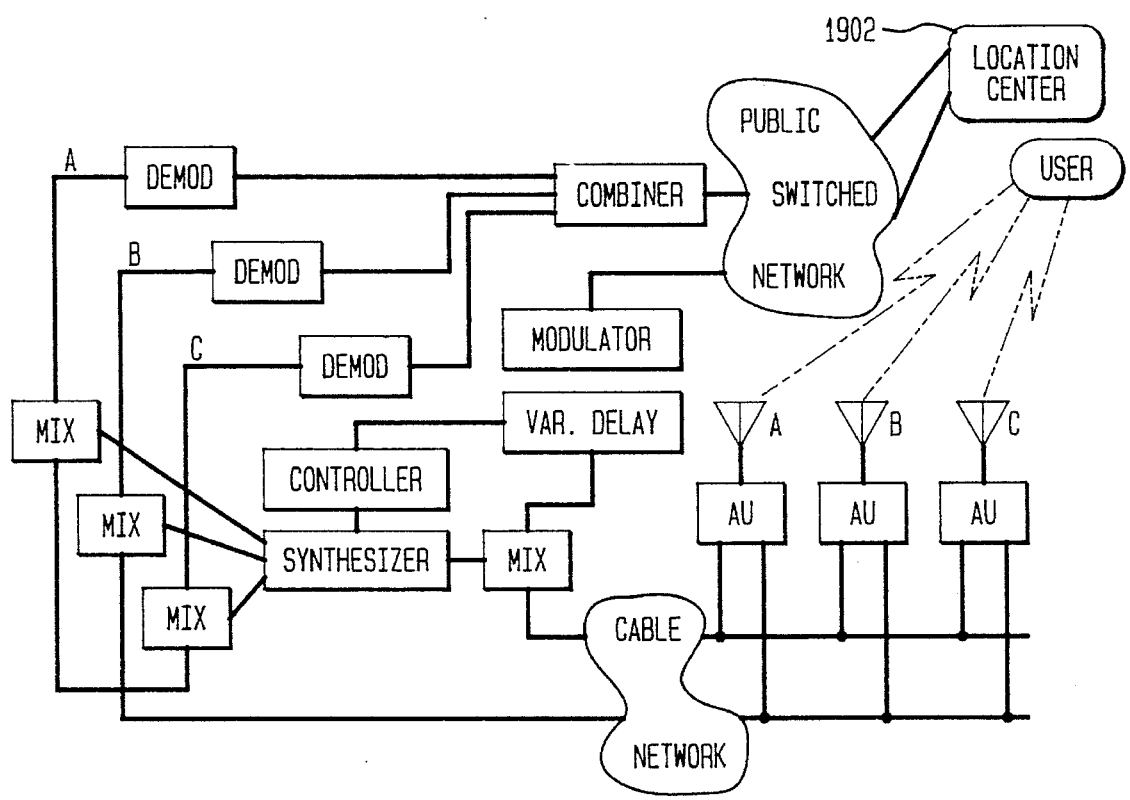
FIG. 19 is a block diagram illustrating a system in accordance with the present wherein the location center is external to the communication system.

Now that the necessary information is available in the user terminal location file, it may be made available to any authorized requester. Location services may be provided by the communications operator or by a competitive independent service provider. In addition, there will also be large private location centers operated by owners of large fleets. The location center 1902 receives the location files over the public switched network, see FIG. 19. The network can be a circuit switched network or a packet switched network. A packet switched network is adequate and economical for this type of application.

What is claimed is:

1. In a wireless communication system, wherein a data packet is communicated from a transmitter to a receiver to form a received data packet, a method for determining the location of said receiver, said system including first, second and third antennas spaced apart from each other, said method comprising:

transmitting said data packet from said first antenna to form a first transmitted data packet;

transmitting said data packet from said second antenna to form a second transmitted data packet after said first transmitted data packet;

transmitting said data packet from said third antenna to form a third transmitted data packet after said second transmitted data packet;

receiving in sequence said first, second and third transmitted data packets at said receiver forming respective first, second and third received data packets;

selecting at least one of said first and second received data packets to form said digital data at said receiver;

measuring the respective time of arrival of said first, second and third transmitted data packets at said receiver; and computing the location of said receiver from said respective measured time of arrival of said first, second and third transmitted data packets.

2. A wireless communication system in accordance with claim 1, wherein said step of computing the location of said receiver from said respective measured time of arrival of said first, second and third transmitted data packets comprises computing the distance to at least one of said first, second and third antennas.

3. A wireless communication system in accordance with claim 1, wherein said step of computing the location of said receiver from said respective measured time of arrival of said first, second and third transmitted data packets comprises computing the difference in distance between said receiver to said first and second antennas.

4. A wireless communication system in accordance with claim 3, wherein said step of computing the location of said receiver from said respective measured time of arrival of said first, second and third transmitted data packets comprises computing the difference in distance between said receiver to said second and third antennas.

5. A wireless communication system in accordance with claim 1, wherein said step of computing the location of said receiver from said respective measured time of arrival of said first, second and third transmitted data packets comprises computing a first distance to said first antenna, computing a second distance to said second antenna and computing a third distance to said third antenna, and calculating the position of said receiver as the intersection of three constant distance curves from said respective first, second and third antennas at said respective first, second and third distances.

6. In a wireless communication system, wherein a data packet is communicated from a base station to a subscriber station using a CDMA PN sequence, said system including at least one transfer station between said base station and said subscriber station for receiving said data packet from said base station and retransmitting said data packet using said PN sequence to said subscriber station on a first antenna to form a first transmitted data packet and retransmitting said data packet using said PN sequence on a second antenna to form a second transmitted data packet after said first transmitted data packet, a method in a receiver in said subscriber station for receiving said data packet, said method comprising:

receiving said first transmitted data packet at said subscriber station receiver forming said first received data packet;

receiving said second transmitted data packet at said subscriber station receiver forming respective second received data packet after receiving said first transmitted data packet;

wherein said system further includes retransmitting said data packet using said PN sequence on a third antenna to form a third transmitted data packet after said second transmitted data packet, said method for receiving said data packet in said subscriber station receiver further comprising:

receiving said third transmitted data packet at said subscriber station receiver forming said third received data packet after receiving said second transmitted data packet;

selecting at least one of said first, second and third received data packets to form said received data packet at said receiver;

measuring the respective time of arrival using said PN sequence phase relative to said first, second and third transmitted data packets at said subscriber station, and computing and subsequently storing in said subscriber station the location of said subscriber station from said respective measured time of arrival of said first, second and third transmitted data packets.

7. A wireless communication system in accordance with claim 6, wherein said step of computing the location of said subscriber station from said respective measured time of arrival of said first, second and third transmitted data packets comprises computing the distance to at least one of said first, second and third antennas.

8. A wireless communication system in accordance with claim 6, wherein said step of computing the location of said subscriber station from said respective measured time of arrival of said first, second and third transmitted data packets comprises computing the difference in distance between said receiver to said first and second antennas.

9. A wireless communication system in accordance with claim 8, wherein said step of computing the location of said subscriber station from said respective measured time of arrival of said first, second and third transmitted data packets comprises computing the difference in distance between said receiver to said second and third antennas.

10. A wireless communication system in accordance with claim 6, wherein said step of computing the location of said subscriber station from said respective measured time of arrival of said first, second and third transmitted data packets comprises computing a first distance to said first antenna, computing a second distance to said second antenna and computing a third distance to said third antenna, and calculating the position of said receiver as the intersection of three constant distance curves from said respective first, second and third antennas at said respective first, second and third distances.

11. A method in accordance with claim 6, further comprising transmitting a location file containing data representing said location of said subscriber station from said subscriber station to said base station.

12. In a wireless communication system, wherein a data packet is communicated from a base station to a subscriber station using a CDMA PN sequence, said system including at least one transfer station between said base station and said subscriber station for receiving said data packet from said base station and retransmitting said data packet using said PN sequence to said subscriber station on a first antenna to form a first transmitted data packet and retransmitting said data packet using said PN sequence on a second antenna to form a second transmitted data packet after said first transmitted data packet, a method in a receiver in said subscriber station for receiving said data packet, said method comprising:

receiving said first transmitted data packet at said subscriber station receiver forming said first received data packet;

receiving said second transmitted data packet at said subscriber station receiver forming respective second received data packet after receiving said first transmitted data packet;

wherein said system further includes retransmitting said data packet using said PN sequence on a third antenna to form a third transmitted data packet after said second transmitted data packet, said method for receiving said data packet in said subscriber station receiver further comprising:

receiving said third transmitted data packet at said subscriber station receiver forming said third received data packet after receiving said second transmitted data packet;

selecting at least one of said first, second and third received data packets to form said received data packet at said receiver;

measuring the respective time of arrival using said PN sequence phase relative to said first, second and third transmitted data packets at said subscriber station;

computing a location file comprising data representing the location of said subscriber station from said respective measured time of arrival of said first, second and third transmitted data packets; and transmitting the contents of said location file containing data corresponding to said measured respective time of arrival of said first, second and third transmitted data packets at said subscriber station from said subscriber station to said base station.

13. A method in accordance with claim 12, wherein said base station receives the contents of said location file containing data corresponding to said measured respective time of arrival of said first, second and third transmitted data packets at said subscriber station, computes the location of said subscriber station, and transmits the computed location of said subscriber station to said subscriber station, said subscriber station method further comprising the step of receiving said computed subscriber station location.

14. A method in accordance with claim 12, wherein said location file contains data representing the distance to one of said first, second and third antennas, and the respective differences in time of arrival of received data packets between said one of said first, second and third antennas, and the remaining two other ones of said first, second and third antennas.

15. A method in accordance with claim 12, wherein said location file data is accessed by said base station by dial up through the public switched telephone network.

16. A method in accordance with claim 12, wherein said location file data is accessed by a password and transmitted to said base station in encrypted form.

17. A method in accordance with claim 12, wherein said location file data is transmitted to said base station responsive to an initiation indication at said subscriber station.

18. A method in accordance with claim 12, wherein said location file data is accessed by a password.

19. A method in accordance with claim 12, wherein said location file data is transmitted to said base station in encrypted form.

20. A method in accordance with claim 12, further comprising transmitting a location file containing data representing said location of said subscriber station from said subscriber station to a location service center separate from said base station.

21. In a wireless communication system, wherein a data packet is communicated from a transmitter to a receiver to form a received data packet, an apparatus for determining the location of said receiver, said system including first, second and third antennas spaced apart from each other, said apparatus comprising:

means for transmitting said data packet from said first antenna to form a first transmitted data packet;

means for transmitting said data packet from said second antenna to form a second transmitted data packet after said first transmitted data packet;

means for transmitting said data packet from said third antenna to form a third transmitted data packet after said second transmitted data packet;

means for receiving in sequence said first, second and third transmitted data packets at said receiver forming respective first, second and third received data packets;

means for selecting at least one of said first and second received data packets to form said digital data at said receiver;

means for measuring the respective time of arrival of said first, second and third transmitted data packets at said receiver; and means for computing the location of said receiver from said respective measured time of arrival of said first, second and third transmitted data packets.

22. A wireless communication system in accordance with claim 21, wherein said means for computing the location of said receiver from said respective measured time of arrival of said first, second and third transmitted data packets comprises computing the distance to at least one of said first, second and third antennas.

23. A wireless communication system in accordance with claim 21, wherein said means for computing the location of said receiver from said respective measured time of arrival of said first, second and third transmitted data packets comprises means for computing the difference in distance between said receiver to said first and second antennas.

24. A wireless communication system in accordance with claim 23, wherein said means for computing the location of said receiver from said respective measured time of arrival of said first, second and third transmitted data packets comprises means for computing the difference in distance between said receiver to said second and third antennas.

25. A wireless communication system in accordance with claim 21, wherein said means for computing the location of said receiver from said respective measured time of arrival of said first, second and third transmitted data packets comprises means for computing a first distance to said first antenna, means for computing a second distance to said second antenna and computing a third distance to said third antenna, and means for calculating the position of said receiver as the intersection of three constant distance curves from said respective first, second and third antennas at said respective first, second and third distances.

26. In a wireless communication system, wherein a data packet is communicated from a base station to a subscriber station using a CDMA PN sequence, said system including at least one transfer station between said base station and said subscriber station for receiving said data packet from said base station and retransmitting said data packet using said PN sequence to said subscriber station on a first antenna to form a first transmitted data packet and retransmitting said data packet using said PN sequence on a second antenna to form a second transmitted data packet after said first transmitted data packet, an apparatus in a receiver in said subscriber station for receiving said data packet, said apparatus comprising:

means for receiving said first transmitted data packet at said subscriber station receiver forming said first received data packet;

means for receiving said second transmitted data packet at said subscriber station receiver forming respective second received data packet after receiving said first transmitted data packet, wherein said system further includes retransmitting said data packet using said PN sequence on a third antenna to form a third transmitted data packet after said second transmitted data packet, said apparatus for receiving said data packet in said subscriber station receiver further comprising:

means for receiving said third transmitted data packet at said subscriber station receiver forming said third received data packet after receiving said second transmitted data packet; means for selecting at least one of said first, second and third received data packets to form said received data packet at said receiver;

means for measuring the respective time of arrival using said PN sequence phase relative to said first, second and third transmitted data packets at said subscriber station, and means for computing and subsequently storing in said subscriber station the location of said subscriber station from said respective measured time of arrival of said first, second and third transmitted data packets.

27. A wireless communication system in accordance with claim 26, wherein said means for computing the location of said subscriber station from said respective measured time of arrival of said first, second and third transmitted data packets comprises computing the distance to at least one of said first, second and third antennas.

28. A wireless communication system in accordance with claim 26, wherein said means for computing the location of said subscriber station from said respective measured time of arrival of said first, second and third transmitted data packets comprises means for computing the difference in distance between said receiver to said first and second antennas.

29. A wireless communication system in accordance with claim 28, wherein said means for computing the location of said subscriber station from said respective measured time of arrival of said first, second and third transmitted data packets comprises means for computing the difference in distance between said receiver to said second and third antennas.

30. A wireless communication system in accordance with claim 26, wherein said means for computing the location of said subscriber station from said respective measured time of arrival of said first, second and third transmitted data packets comprises means for computing a first distance to said first antenna, means for computing a second distance to said second antenna and means for computing a third distance to said third antenna, and means for calculating the position of said receiver as the intersection of three constant distance curves from said respective first, second and third antennas at said respective first, second and third distances.

31. An apparatus in accordance with claim 26, further comprising means for transmitting a location file containing data representing said location of said subscriber station from said subscriber station to said base station.

32. In a wireless communication system, wherein a data packet is communicated from a base station to a subscriber station using a cdma PN sequence, said system including at least one transfer station between said base station and said subscriber station for receiving said data packet from said base station and retransmitting said data packet using said PN sequence to said subscriber station on a first antenna to form a first transmitted data packet and retransmitting said data packet using said PN sequence on a second antenna to form a second transmitted data packet after said first transmitted data packet, an apparatus in a receiver in said subscriber station for receiving said data packet, said apparatus comprising:

means for receiving said first transmitted data packet at said subscriber station receiver forming said first received data packet;

means for receiving said second transmitted data packet at said subscriber station receiver forming respective second received data packet after receiving said first transmitted data packet;

wherein said system further includes means for retransmitting said data packet using said PN sequence on a third antenna to form a third transmitted data packet after said second transmitted data packet, said apparatus for receiving said data packet in said subscriber station receiver further comprising:

means for receiving said third transmitted data packet at said subscriber station receiver forming said third received data packet after receiving said second transmitted data packet;

means for selecting at least one of said first, second and third received data packets to form said received data packet at said receiver;

means for measuring the respective time of arrival using said PN sequence phase relative to said first, second and third transmitted data packets at said subscriber station;

means for computing a location file comprising data representing the location of said subscriber station from said respective measured time of arrival of said first, second and third transmitted data packets; and means for transmitting the contents of said location file containing data corresponding to said measured respective time of arrival of said first, second and third transmitted data packets at said subscriber station from said subscriber station to said base station.

33. An apparatus in accordance with claim 32, wherein said base station receives the contents of said location file containing data corresponding to said measured respective time of arrival of said first, second and third transmitted data packets at said subscriber station, computes the location of said subscriber station, and transmits the computed location of said subscriber station to said subscriber station, said subscriber station apparatus further comprising the means for receiving said computed subscriber station location.

34. An apparatus in accordance with claim 32, wherein said location file contains data representing the distance to one of said first, second and third antennas, and the respective differences in time of arrival of received data packets between said one of said first, second and third antennas, and the remaining two other ones of said first, second and third antennas.

35. An apparatus in accordance with claim 32, wherein said location file data is accessed by said base station by dial up through the public switched telephone network.

36. An apparatus in accordance with claim 32, wherein said location file data is accessed by a password and transmitted to said base station in encrypted form.

37. An apparatus in accordance with claim 32, wherein said location file data is transmitted to said base station responsive to an initiation indication at said subscriber station.

38. An apparatus in accordance with claim 32, wherein said location file data is accessed by a password.

39. An apparatus in accordance with claim 32, wherein said location file data is transmitted to said base station in encrypted form.

40. An apparatus in accordance with claim 32, further comprising means for transmitting a location file containing data representing said location of said subscriber station from said subscriber station to a location service center separate from said base station.

41. In a wireless communication system, wherein a data packet is communicated from a transmitter to a receiver to form a received data packet, including a method for determining the location of said receiver, said system including first, second and third antennas spaced apart from each other, a method for calibrating said location system, said calibration method comprising:

positioning a calibration receiver at a known location;

transmitting said data packet from said first antenna to form a first transmitted data packet;

transmitting said data packet from said second antenna to form a second transmitted data packet after said first transmitted data packet;

transmitting said data packet from said third antenna to form a third transmitted data packet after said second transmitted data packet;

receiving in sequence said first, second and third transmitted data packets at said calibration receiver forming respective first, second and third received data packets;

measuring the respective time of arrival of said first, second and third transmitted data packets at said calibration receiver;

computing the location of said calibration receiver from said respective measured time of arrival of said first, second and third transmitted data packets; and comparing the computed location of said calibration receiver to said known location.

42. A wireless communication system in accordance with claim 41, wherein said calibration method further comprises computing the difference between said computed location and said known location, and introducing respective delays in transmissions from said first, second and third antennas to calibrate said system.

43. A wireless communication system in accordance with claim 41, wherein said calibration method further comprises computing error indications representing the difference between said computed location and said known location, and storing said error indications for use in said method for determining the location of said receiver to calibrate said system.

44. In a wireless communication system, wherein a data packet is communicated from a transmitter to a receiver to form a received data packet, including an apparatus for determining the location of said receiver, said system including first, second and third antennas spaced apart from each other, an apparatus for calibrating said location system, said calibration apparatus comprising:

a calibration receiver positioned at a known location;

means for transmitting said data packet from said first antenna to form a first transmitted data packet;

means for transmitting said data packet from said second antenna to form a second transmitted data packet after said first transmitted data packet;

means for transmitting said data packet from said third antenna to form a third transmitted data packet after said second transmitted data packet;

means for receiving in sequence said first, second and third transmitted data packets at said calibration receiver forming respective first, second and third received data packets;

means for measuring the respective time of arrival of said first, second and third transmitted data packets at said calibration receiver;

means for computing the location of said calibration receiver from said respective measured time of arrival of said first, second and third transmitted data packets; and means for comparing the computed location of said calibration receiver to said known location.

45. A wireless communication system in accordance with claim 44, wherein said calibration means further comprises means for computing the difference between said computed location and said known location, and means for introducing respective delays in transmissions from said first, second and third antennas to calibrate said system.

46. A wireless communication system in accordance with claim 44, wherein said calibration means further comprises means for computing error indications representing the difference between said computed location and said known location, and means for storing said computed error indications for use in said means for determining the location of said receiver to calibrate said system.

47. In a wireless communication system, wherein a data packet is communicated from a base station to a subscriber station using a CDMA PN sequence, said system including at least one transfer station between said base station and said subscriber station for receiving said data packet from said base station and retransmitting said data packet using said PN sequence to said subscriber station on a first antenna to form a first transmitted data packet and retransmitting said data packet using said PN sequence on a second antenna to form a second transmitted data packet after said first transmitted data packet, a method in a receiver in said subscriber station for receiving said data packet, said method comprising:

receiving said first transmitted data packet at said subscriber station receiver forming said first received data packet;

receiving said second transmitted data packet at said subscriber station receiver forming respective second received data packet after receiving said first transmitted data packet;

wherein said system further includes retransmitting said data packet using said PN sequence on a third antenna to form a third transmitted data packet after said second transmitted data packet, said method for receiving said data packet in said subscriber station receiver further comprising:

receiving said third transmitted data packet at said subscriber station receiver forming said third received data packet after receiving said second transmitted data packet;

selecting at least one of said first, second and third received data packets to form said received data packet at said receiver;

measuring the respective time of arrival using said PN sequence phase relative to said first, second and third transmitted data packets at said subscriber station;

computing a location file comprising data corresponding to said respective measured time of arrival of said first, second and third transmitted data packets; and transmitting the contents of said location file containing data corresponding to said measured respective time of arrival of said first, second and third transmitted data packets at said subscriber station from said subscriber station to a location service center separate from said base station.

48. A method in accordance with claim 47, wherein said location service center receives the contents of said location file containing data corresponding to said measured respective time of arrival of said first, second and third transmitted data packets at said subscriber station, computes the location of said subscriber station, and transmits the computed location of said subscriber station to said subscriber station, said subscriber station method further comprising the step of receiving and displaying said computed subscriber station location.

49. A method in accordance with claim 47, wherein said location file data is accessed by a location service center center separate from said base station, and connected to said base staion through the public switched telephone network.

50. A method in accordance with claim 47, wherein said location file data is accessed by a password and transmitted to a location service center separate from said base station through the public switched telephone network.

51. A method in accordance with claim 47, wherein said location file data is transmitted to said base station responsive to an initiation indication at said subscriber station and to a location service center separate from said base station through the public switched telephone network.

52. In a wireless communication system, wherein a data packet is communicated from a base station to a subscriber station using a cdma PN sequence, said system including at least one transfer station between said base station and said subscriber station for receiving said data packet from said base station and retransmitting said data packet using said PN sequence to said subscriber station on a first antenna to form a first transmitted data packet and retransmitting said data packet using said PN sequence on a second antenna to form a second transmitted data packet after said first transmitted data packet, an apparatus in a receiver in said subscriber station for receiving said data packet, said apparatus comprising:

means for receiving said first transmitted data packet at said subscriber station receiver forming said first received data packet;

means for receiving said second transmitted data packet at said subscriber station receiver forming respective second received data packet after receiving said first transmitted data packet;

wherein said system further includes retransmitting said data packet using said PN sequence on a third antenna to form a third transmitted data packet after said second transmitted data packet, said apparatus for receiving said data packet in said subscriber station receiver further comprising:

means for receiving said third transmitted data packet at said subscriber station receiver forming said third received data packet after receiving said second transmitted data packet;

means for selecting at least one of said first, second and third received data packets to form said received data packet at said receiver;

means for measuring the respective time of arrival using said PN sequence phase relative to said first, second and third transmitted data packets at said subscriber station;

means for computing a location file comprising data corresponding to said respective measured time of arrival of said first, second and third transmitted data packets; and means for transmitting the contents of said location file containing data corresponding to said measured respective time of arrival of said first, second and third transmitted data packets at said subscriber station from said subscriber station to a location service center separate from said base station.

53. An apparatus in accordance with claim 52, wherein said location service center receives the contents of said location file containing data corresponding to said measured respective time of arrival of said first, second and third transmitted data packets at said subscriber station, computes the location of said subscriber station, and transmits the computed location of said subscriber station to said subscriber station, said subscriber station apparatus further comprising the means for receiving and displaying said computed subscriber station location.

54. An apparatus in accordance with claim 52, wherein said location file data is accessed by a location service center center separate from said base station, and connected to said base station through the public switched telephone network.

55. An apparatus in accordance with claim 52, wherein said location file data is accessed by a password and transmitted to a location service center separate from said base station through the public switched telephone network.

56. An apparatus in accordance with claim 52, wherein said location file data is transmitted to said base station responsive to an initiation indication at said subscriber station and to a location service center separate from said base station through the public switched telephone network.

57. In a wireless CDMA communication system, wherein data packets are communicated from a plurality of transmitters to a receiver using at least one CDMA PN sequence to form a plurality of received data packets, said CDMA communication system including first, second and third antennas spaced apart from each other, a method for determining the actual geographic location of said receiver, said method comprising:

receiving said first, second and third transmitted data packets at said receiver forming respective first, second and third received data packets;

measuring the respective time of arrival using said PN sequence phase relative to at least one of said first, second and third transmitted data packets at said receiver;

storing the geographic coordinates of said first, second and third antennas; and computing the actual geographic location of said receiver from said stored geographic coordinates of said first, second and third antennas and said respective measured time of arrival of said first, second and third transmitted data packets.

58. A wireless communication system in accordance with claim 57, wherein said step of computing the actual geographic location of said receiver from said respective measured time of arrival of said first, second and third transmitted data packets comprises computing the difference in distance between said receiver to said first and second antennas.

59. A wireless communication system in accordance with claim 58, wherein said step of computing the actual geographic location of said receiver from said respective measured time of arrival of said first, second and third transmitted data packets comprises computing the difference in distance between said receiver to said second and third antennas.

60. A wireless communication system in accordance with claim 59, wherein said step of computing the actual geographic location of said receiver from said respective measured time of arrival of said first, second and third transmitted data packets comprises computing the position of said receiver as the intersection of first and second hyperbolas; said first hyperbola being the locus of all points having a fixed difference in distance between said receiver to said first and second antennas, said second hyperbola being the locus of all points having a fixed difference in distance between said receiver to said first and third antennas.

61. A wireless communication system in accordance with claim 57, wherein said step of computing the actual geographic location of said receiver from said respective measured time of arrival of said first, second and third transmitted data packets comprises computing a first distance to said first antenna, computing a second distance to said second antenna and computing a third distance to said third antenna, and calculating the position of said receiver as the intersection of three constant distance curves from said respective first, second and third antennas at said respective first, second and third distances.

62. A method in accordance with claim 57, further comprising:
computing a location file at said receiver comprising data corresponding to said measured respective time of arrival of said first, second and third transmitted data packets at said receiver, said location file representing the location of said receiver from said respective measured time of arrival of said first, second and third transmitted data packets containing data; and
transmitting the contents of said location file from said receiver to a base station.

63. A method in accordance with claim 62, at said base station comprising:
receiving the contents of said location file containing data corresponding to said measured respective time of arrival of said first, second and third transmitted data packets at said receiver;
computing the location of said receiver to form a computed receiver location; and
transmitting the computed location of said receiver to said receiver, said receiver method further comprising the step of receiving said computed receiver location.

64. A method in accordance with claim 62, wherein said location file contains data representing the distance to one of said first, second and third antennas, and the respective differences in time of arrival of received data packets between said one of said first, second and third antennas, and the remaining two other ones of said first, second and third antennas.

65. A method in accordance with claim 62, wherein said location file data is accessed by said base station by dial up through the public switched telephone network.

66. A method in accordance with claim 62, wherein said location file data is accessed by a password and transmitted to said base station in encrypted form.

67. A method in accordance with claim 62, wherein said location file data is transmitted to said base station responsive to an initiation indication at said receiver.

68. In a wireless CDMA communication system, wherein data packets are communicated from a plurality of transmitters to a receiver using at least one CDMA PN sequence to form a plurality of received data packets, said CDMA communication system including first, second and third antennas spaced apart from each other, an apparatus for determining the actual geographic location of said receiver, said apparatus comprising:
means for receiving said first, second and third transmitted data packets at said receiver forming respective first, second and third received data packets;
means for measuring the respective time of arrival using said PN sequence phase relative to at least one of said first, second and third transmitted data packets at said receiver;
means for storing the geographic coordinates of said first, second and third antennas; and
means for computing the actual geographic location of said receiver from said stored geographic coordinates of said first, second and third antennas and said respective measured time of arrival of said first, second and third transmitted data packets.

69. A wireless communication system in accordance with claim 68, wherein said means for computing the actual geographic location of said receiver from said respective measured time of arrival of said first, second and third transmitted data packets comprises computing the difference in distance between said receiver to said first and second antennas.

70. A wireless communication system in accordance with claim 69, wherein said means for computing the actual geographic location of said receiver from said respective measured time of arrival of said first, second and third transmitted data packets comprises computing the difference in distance between said receiver to said second and third antennas.

71. A wireless communication system in accordance with claim 70, wherein said means for computing the actual geographic location of said receiver from said respective measured time of arrival of said first, second and third transmitted data packets comprises computing the position of said receiver as the intersection of first and second hyperbolas; said first hyperbola being the locus of all points having a fixed difference in distance between said receiver to said first and second antennas, said second hyperbola being the locus of all points having a fixed difference in distance between said receiver to said first and third antennas.

72. A wireless communication system in accordance with claim 68, wherein said means for computing the actual geographic location of said receiver from said respective measured time of arrival of said first, second and third transmitted data packets comprises computing a first distance to said first antenna, computing a second distance to said second antenna and computing a third distance to said third antenna, and calculating the position of said receiver as the intersection of three constant distance curves from said respective first, second and third antennas at said respective first, second and third distances.

73. An apparatus in accordance with claim 68, further comprising:
means for computing a location file at said receiver comprising data corresponding to said measured respective time of arrival of said first, second and third transmitted data packets at said receiver, said location file representing the location of said receiver from said respective measured time of arrival of said first, second and third transmitted data packets containing data; and means for transmitting the contents of said location file from said receiver to a base station.

74. An apparatus in accordance with claim 73, at said base station comprising:

means for receiving the contents of said location file containing data corresponding to said measured respective time of arrival of said first, second and third transmitted data packets at said receiver;

means for computing the location of said receiver to form a computed receiver location; and means for transmitting the computed location of said receiver to said receiver, said receiver apparatus further comprising the means for receiving said computed receiver location.

75. An apparatus in accordance with claim 73, wherein said location file contains data representing the distance to one of said first, second and third antennas, and the respective differences in time of arrival of received data packets between said one of said first, second and third antennas, and the remaining two other ones of said first, second and third antennas.

76. An apparatus in accordance with claim 73, wherein said location file data is accessed by said base station by dial up through the public switched telephone network.

77. An apparatus in accordance with claim 73, wherein said location file data is accessed by a password and transmitted to said base station in encrypted form.

78. An apparatus in accordance with claim 73, wherein said location file data is transmitted to said base station responsive to an initiation indication at said receiver.

79. A method in accordance with claim 62, further comprising transmitting a location file containing data representing said location of said subscriber station from said subscriber station to a location service center separate from said base station.

80. An apparatus in accordance with claim 73, further comprising means for transmitting a location file containing data representing said location of said subscriber station from said subscriber station to a location service center separate from said base station.

* * * * *